USOO5545345A

United States Patent [19]

Sekine et al.

[11] Patent Number: 5,545,345
[45] Date of Patent: Aug. 13, 1996

[54] LIQUID CRYSTAL MIXTURE AND LIQUID CRYSTAL ELEMENT COMPRSING THE SAME

[75] Inventors: Chizu Sekine; Takeshi Tani; Kayoko Ueda; Koichi Fujisawa, all of Tsukuba; Takayuki Higashii, Yokohama; Yukari Fujimoto, Takatsuki; Shoji Toda, Takatsuki; Masayoshi Minai, Moriyama, all of Japan

[73] Assignee: Sumitomo Chemical Company, Limited, Osaka, Japan

[21] Appl. No.: 282,022

[22] Filed: Jul. 29, 1994

[30] Foreign Application Priority Data

Jul. 30, 1993 [JP] Japan ................... 5-208667
Aug. 10, 1993 [JP] Japan ................... 5-198219

[51] Int. Cl.⁶ ................... C09K 19/34; C09K 19/20; G02F 1/13
[52] U.S. Cl. ................... 252/299.61; 252/199.67; 359/104
[58] Field of Search ................... 252/299.01, 299.61, 252/299.67; 359/103, 104

[56] References Cited

FOREIGN PATENT DOCUMENTS

| 328330 | 8/1989 | European Pat. Off. . |
| 347943 | 12/1989 | European Pat. Off. . |
| 357435 | 3/1990 | European Pat. Off. . |
| 360622 | 3/1990 | European Pat. Off. . |
| 434297 | 6/1991 | European Pat. Off. . |
| 435632 | 7/1991 | European Pat. Off. . |
| 549279 | 6/1993 | European Pat. Off. . |
| 2-43282 | 2/1990 | Japan . |

*Primary Examiner*—Shean C. Wu
*Attorney, Agent, or Firm*—Birch, Stewart, Kolasch & Birch, LLP

[57] ABSTRACT

A ferroelectric chiral smectic liquid crystal mixture comprising a compound of the formula (I):

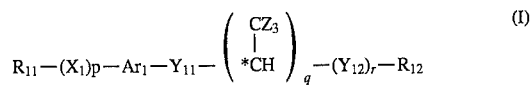

and at least one compound selected from the group consisting of a compound of the formula (II):

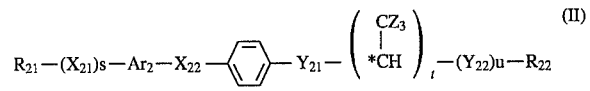

and a compound of the formula (III):

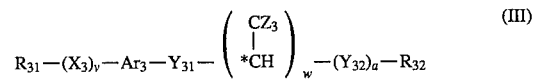

8 Claims, 2 Drawing Sheets

LIQUID CRYSTAL MIXTURE AND LIQUID CRYSTAL ELEMENT COMPRSING THE SAME

BACKGROUND OF THE INVENTION

1. Field of the Invention

The present invention relates to a novel ferroelectric chiral smectic liquid crystal mixture and a liquid crystal element comprising the same. In particular, the present invention relates to a novel liquid crystal mixture having an improved contrast ratio and memory capability, and a liquid crystal element comprising the same which can be used in an optical shutter or a display device.

2. Description of the Related Art

With the recent progress of the information society, importance of a display device as one of man-machine interfaces has been greatly increased. Among such display devices, a flat panel display device such as a liquid crystal display (LCD) is quickly spread since it has various advantages such as a thin thickness, a light weight, a low driving voltage, a low power demand, and the like. Among the liquid crystal devices represented by the liquid crystal display, a matrix-addressed liquid crystal device having a large capacity of information includes two types of driving systems, namely an active-matrix-addressed system and a passive-matrix-addressed system.

In the active-matrix-addressed system, a thin film transistor or diode made of polysilicon or amorphous silicon is connected to each picture element as a non-linear element. However, the active-matrix-addressed system may have some problems in assembling a large area display, lowering a production cost or increasing a density because of complicated production steps and low yield. In view of the cost and productivity, the passive-matrix-addressed system is advantageous.

As liquid crystal devices of the passive-matrix-addressed LC display which are currently practically used, TN liquid crystal and STN liquid crystal devices are mainly used. However, their optical response utilizes an average orientation of a molecule-axis of the liquid crystal in a specific direction based on anisotropy of a dielectric constant of the liquid crystal molecule, which is caused by the application of an electric field. Then, a limit of an optical response speed of such devices is in the order of millisecond, and such response speed is insufficient in view of the increase of an amount of information. When the number of scanning lines is increased to increase the capacity of information, the decrease of the contrast ratio or cross-talk cannot be avoided inevitably. Those are the essential problems since the TN or STN liquid crystal device has no memory property (bistability). To solve such problems, various driving methods such as a dual frequency diving method, a voltage averaging method, a multimatrix method, and the like have been proposed. But, they cannot provide the fundamental solution of the problems. By such methods, it is difficult to increase the capacity or the density. Further, the TN or STN liquid crystal device has serious problems such as limitation of a view angle or quality of display.

To solve the essential problem of the above liquid crystal devices, in 1980, N. A. Clark and S. T. Lagerwall proposed a liquid, crystal element utilizing a liquid crystal having bistability (see U.S. Pat. No. 4,367,924 and Japanese Patent KOKAI Publication No. 107216/1981). As the liquid crystal having the bistability, there is used a ferroelectric liquid crystal which has a chiral smectic C phase.

One of the advantages achieved by the use of the ferroelectric liquid crystal is that it has the bistability. The bistability is a property such that, when a ferroelectric liquid crystal is held between a pair of glass plates each carrying a transparent electrode, the ferroelectric liquid crystal has two different optically stable states depending on directions of the applied electric field, and the two optically stable states are maintained after the removal of the electric fields. Because of such property, the liquid crystal device utilizing the ferroelectric liquid crystal is expected not to suffer from the decrease of the contrast ratio or cross-talk even when the number of scanning lines is increased.

Another characteristic of the ferroelectric liquid crystal resides in a high response speed. That is, the optical response of the ferroelectric liquid crystal is about 1000 times faster than that of the TN or STN liquid crystal, since the former utilizes a change of the orientation of the liquid crystal molecules caused by the direct interaction between spontaneous polarization of the ferroelectric liquid crystal and the electric field.

Accordingly, the ferroelectric liquid crystal has the following essential characteristics:

(1) It has two optically stable states, and those optically stable states are maintained after the removal of the electric field (bistability), and (2) The above two optically stable states can be switched in a microsecond order (high response speed).

In addition, in the ferroelectric liquid crystal device, the liquid crystal molecules respond to the electric field in parallel with the substrate and a cell thickness is made thin, so that dependency of the display on the view angle is small (large view angle).

Consequently, the ferroelectric liquid crystal device does not require the expensive non-linear element as in the case of the active-matrix-addressed system, and is expected to provide a high quality large display which can achieve the large information capacity and high quality display by the passive-matrix-addressed system.

Then, a large number of studies on the liquid crystal materials having ferroelectricity have been reported. To use the ferroelectric liquid crystal device practically, there still remain some problems to be solved. In particular, it is highly desired to provide a liquid crystal which has good orientation and memory capability.

SUMMARY OF THE INVENTION

One object of the present invention is to provide a ferroelectric liquid crystal mixture which has good orientation, a high contrast ration and an excellent memory capability.

Another object of the present invention is to provide a liquid crystal device comprising such ferroelectric liquid crystal mixture.

According to a first aspect of the present invention, there is provided a ferroelectric chiral smectic liquid crystal mixture comprising:

at least one compound of the formula (I):

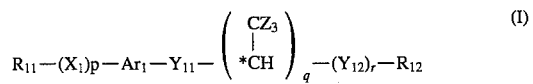

wherein $R_{11}$ is an alkyl group having 5 to 15 carbon atoms; $R_{12}$ is an alkyl group having 1 to 10 carbon atoms or an alkoxyalkyl group having 2 to 10 carbon atoms, which may be substituted by at least one halogen atom; $X_1$ is —O—, —COO— or —OCO—; $Ar_1$ is one of the groups:

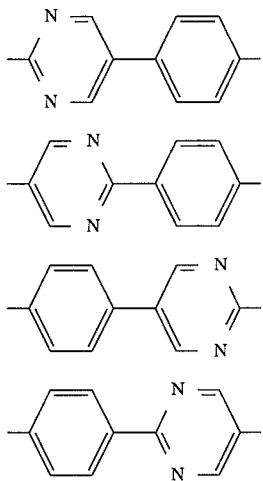

$Y_{11}$ is —$(CH_2)_m$— or —CH=CH—$(CH_2)_n$— in which m is an integer of 0 to 10 and n is an integer of 0 to 8; Z is a hydrogen atom or a fluorine atom; $Y_{12}$ is —O—, —COO— or —OCO—; p, q and r are each 0 or 1; and the asterisk * indicates an asymmetric carbon atom, and at least one compound selected from the group consisting of a compound of the formula (II):

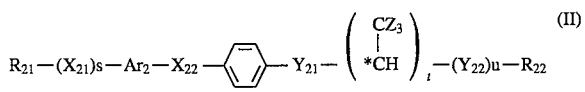

wherein $R_{21}$ is an alkyl group having 5 to 15 carbon atoms; $R_{22}$ is an alkyl group having 1 to 20 carbon atoms or an alkoxyalkyl group having 2 to 20 carbon atoms; $X_{21}$ is ≤O—, —COO— or —OCO—; $X_{22}$ is —COO— or —OCO—; t is 0 or 1; $Ar_2$ is one of the groups:

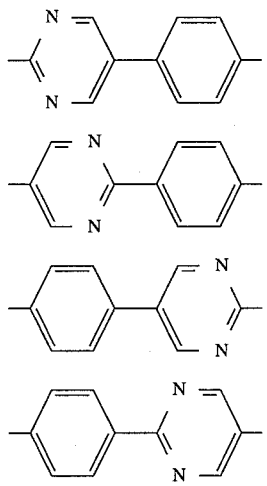

Z is a hydrogen atom or a fluorine atom; $Y_{21}$ is —$(CH_2)_k$— in which k is an integer of 0 to 10 when t is 1 or an integer of 0 to 11 when t is 0; $Y_{22}$ is —O— or —OCO—; s, t and u are each 0 or 1; and the asterisk * indicates an asymmetric carbon atom and a compound of the formula (III):

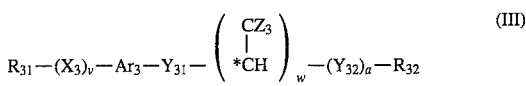

wherein $R_{31}$ is an alkyl group having 5 to 15 carbon atoms; $X_3$ is —O—, —COO— or —OCO—; $R_{32}$ is an alkyl group having 1 to 20 carbon atoms or an alkoxyalkyl group having 2 to 20 carbon atoms; $Ar_3$ is one of the groups:

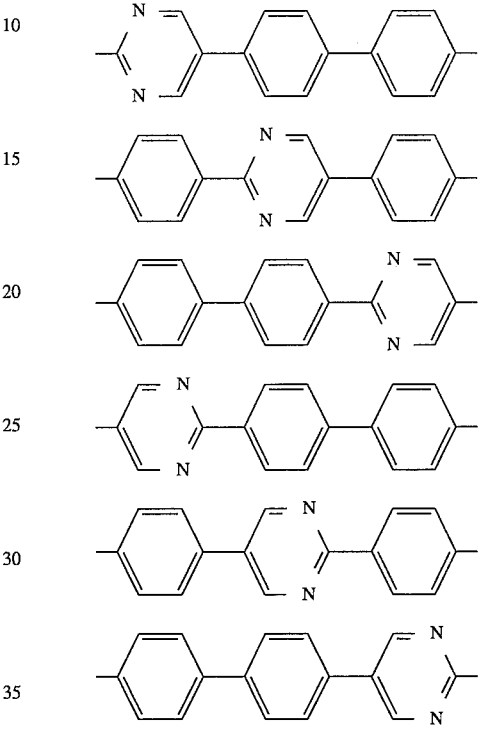

Z is a hydrogen atom or a fluorine atom; $Y_{31}$ is —$(CH_2)_j$— in which j is an integer of 0 to 10 when w is 1 or an integer of 0 to 11 when w is 0; $Y_{32}$ is —O— or —OCO—; v, w and a are each 0 or 1; and the asterisk * indicates an asymmetric carbon atom, where a molar ratio of the compound (I) to at least one compound selected from the group consisting of the compound (II) and the compound (III) is from 80:20 to 20:80.

In a second aspect of the present invention, there is provided a ferroelectric chiral smectic liquid crystal mixture comprising:
at least one compound of the formula (I) and
at least one compound of the formula (IV):

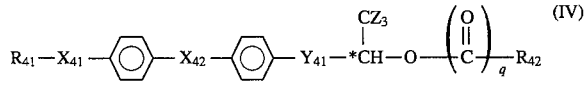

wherein $R_{41}$ is an alkyl group having 5 to 15 carbon atoms; $R_{42}$ is an alkyl group having 1 to 10 carbon atoms or an alkoxyalkyl group having 2 to 10 carbon atoms, which may be substituted by at least one halogen atom; $X_{41}$ is —O—, —COO—, —OCO— or a single bond; $X_{42}$ is —COO— or —OCO—; $Y_{41}$ is —$(CH_2)_m$ in which m is an integer of 1 to 10; three Z substituents are independently a hydrogen atom or a fluorine atom; q is 0 or 1; and the asterisk * indicates an asymmetric carbon atom, where a molar ratio of the compound (I) to the compound (IV) is from 10:90 to 75:25.

According to a third aspect of the present invention, there is provided a ferroelectric chiral smectic mixture comprising:

at least one compound of the formula (I) in which q is 1 and m is an integer of at least 1; and $Y_{12}$ is —O— or —OCO— and at least one compound of the formula (IV) wherein a molar ratio of the compound (I) to the compound (IV) is from 10:90 to 75:25.

According to a fourth aspect of the present invention, there is provided a ferroelectric chiral smectic mixture comprising:

at least one compound of the formula (I), at least one compound selected from the group consisting the compound of the formula (II) and the compound (III), and at least one compound of the formula (IV) where a molar composition is 10 to 75 parts by mole of the compound (I), 80 to 1 parts by mole of at least one compound selected from the group consisting the compound of the formula (II) and the compound (III) and 90 to 1 parts by mole of the compound (IV), provided that the total amount of the compounds (I), (II), (III) and (IV) is 100 parts by mole.

According to the fifth aspect of the present invention, there is provided a liquid crystal device comprising a pair of electrode substrates and a ferroelectric chiral smectic liquid crystal mixture according to one of the first, second, third and fourth aspects of the present invention which is sandwiched between said glass substrates.

DETAILED DESCRIPTION OF THE INVENTION

Figure 1:
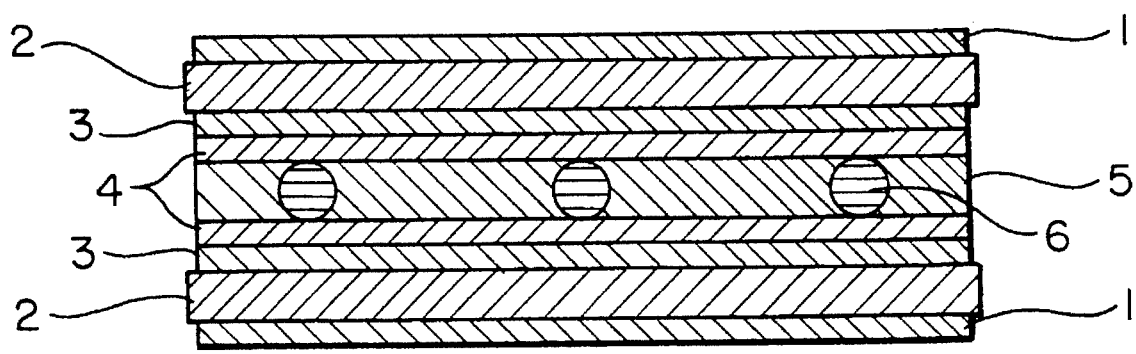
FIG. 1 is a schematic cross sectional view of an embodiment of the liquid crystal element.

Specific examples of the compound of the formula (I) are following compounds (1—1H) to (1–16H), (1—1F) to (1–16F), (1–17) to (1–32), (1–33H)to (1–48H), (1–33F) to (1–48F), (1–49) to (1–64), ( 1–65H) to (1–80H), (1–65F) to (1–80F), (1–81) to (1–96), (1–97H) to (1–112H), (1–97F) to (1–112F), and (1–113) to (1–128).

The compound of the formula (I) is a known compound and may be prepared by the methods disclosed in Japanese Patent KOKAI Publication Nos. 128267/1992 and 178369/1992 (corresponding to EP-A-360 622 and 435 632).

Specific examples of the compound of the formula (II) are following compounds (2-1H) to (2-16H), (2-1F) to (2–6F), (2–17) to (2–32), (2–33H) to (2–48H), (2–33F) to (2–48F), and (2–49) to (2–64).

Specific examples of the compound of the formula (III) are following compounds (3-1H) to (3–24H), (3-1F) to (3–24F), and (3–25) to (3–48).

The compounds of the formulas (II) and (III) are known compounds and may be prepared by the methods disclosed in Japanese Patent KOKAI Publication Nos. 53661/1981 and 174766/1994 (corresponding to EP-A-025 119 and 360 622).

By the combination of the compound of the formula (I) with the compound of the formula (II) and/or the compound of the formula (III), the contrast ratio is increased.

Among the above specific examples the compound of the formula (I), the compounds of the formulas (1–5H) to (1–12H), (1–5F) to (1–12F), (1–21) to (1–28), (1–37H) to (1–44H), (1–37F) to (1–44F), (1–53) to (1–60), (1–69H) to (1–76H), (1–69F) to (1–76F), (1–85) to (1–92), (1–101H) to (1–108H), (1–101F) to (1–108F), and (1–117) to (1–124) are preferred.

The more preferred examples of the compound of the formula (I) are (1–5H), (1–9H), (1–5F), (1–9F), (1–21), (1–24), (1–25), (1–28), (1–37H), (1–41H), (1–53), (1–56), (1–57), (1–60), ( 1–69H), (1–73H), (1–85), (1–89), (1–101H), (1–105H), (1–101F), (1–105F), (1–117) and (1–121).

Among the above specific examples of the compound of the formula (II), the compounds of the formulas (2–5H) to (2–12H), (2–5F) to (2–12F), (2–21) to (2–28), (2–37H) to (2–44H), (2–37F) to (2–44F), and (2–53) to (2–60) are preferred.

The more preferred examples of the compound of the formula (II) are the compounds of the formulas (2–5H), (2–8H), (2–5F), (2–8F), (2–21), (2–24), (2–37H), (2–40H), (2–37F), (2–40F), (2–53) and (2–56).

Among the above specific examples of the compound of the formula (III), the compounds of the formulas (3–5H) to (3–20H), (3–5F) to (3–20F), and (3–29) to (3–44) are preferred.

More preferred examples of the compound of the formula (III) are the compounds of the formulas (3–5H), (3–8H), (3–5F), (3–8F) (3–29) and (3–32).

Specific examples of the compounds of the formula (IV) are the following compounds (4-1H) to (4–16H) and (4-1F) to (4–16F).

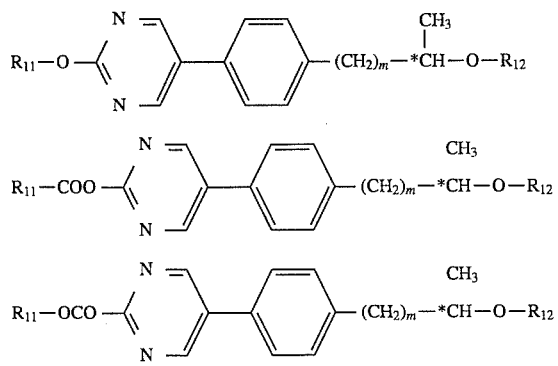

(1-1H)

(1-2H)

(1-3H)

-continued
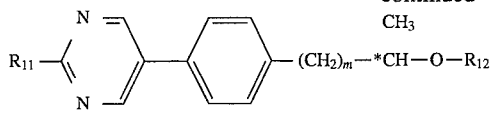 (1-4H)
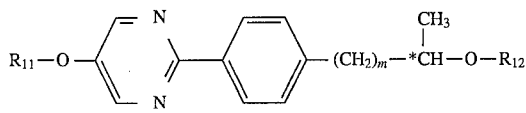 (1-5H)
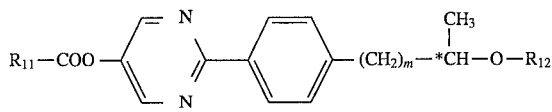 (1-6H)
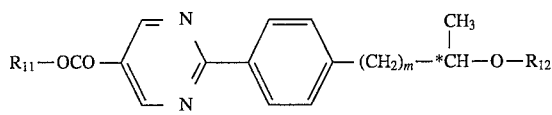 (1-7H)
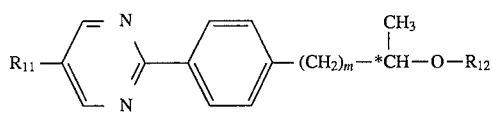 (1-8H)
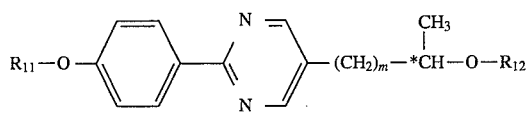 (1-9H)
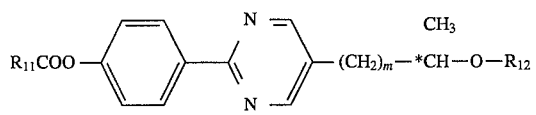 (1-10H)
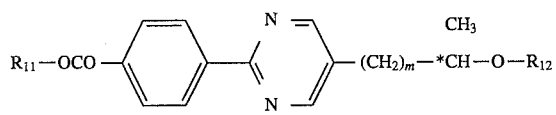 (1-11H)
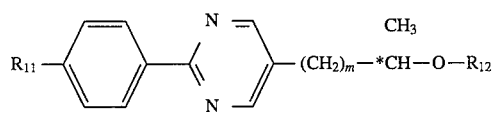 (1-12H)
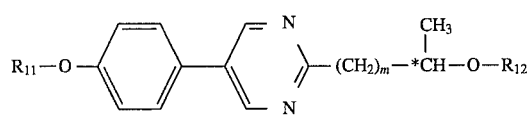 (1-13H)
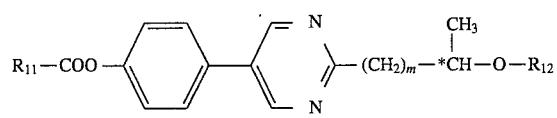 (1-14H)
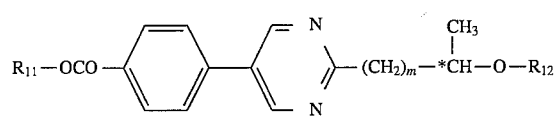 (1-15H)
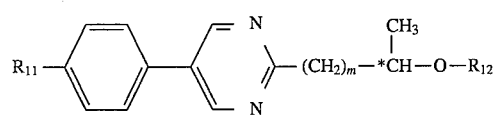 (1-16H)
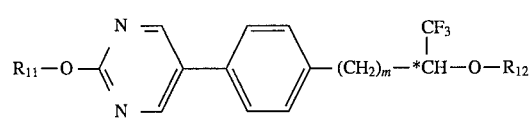 (1-1F)

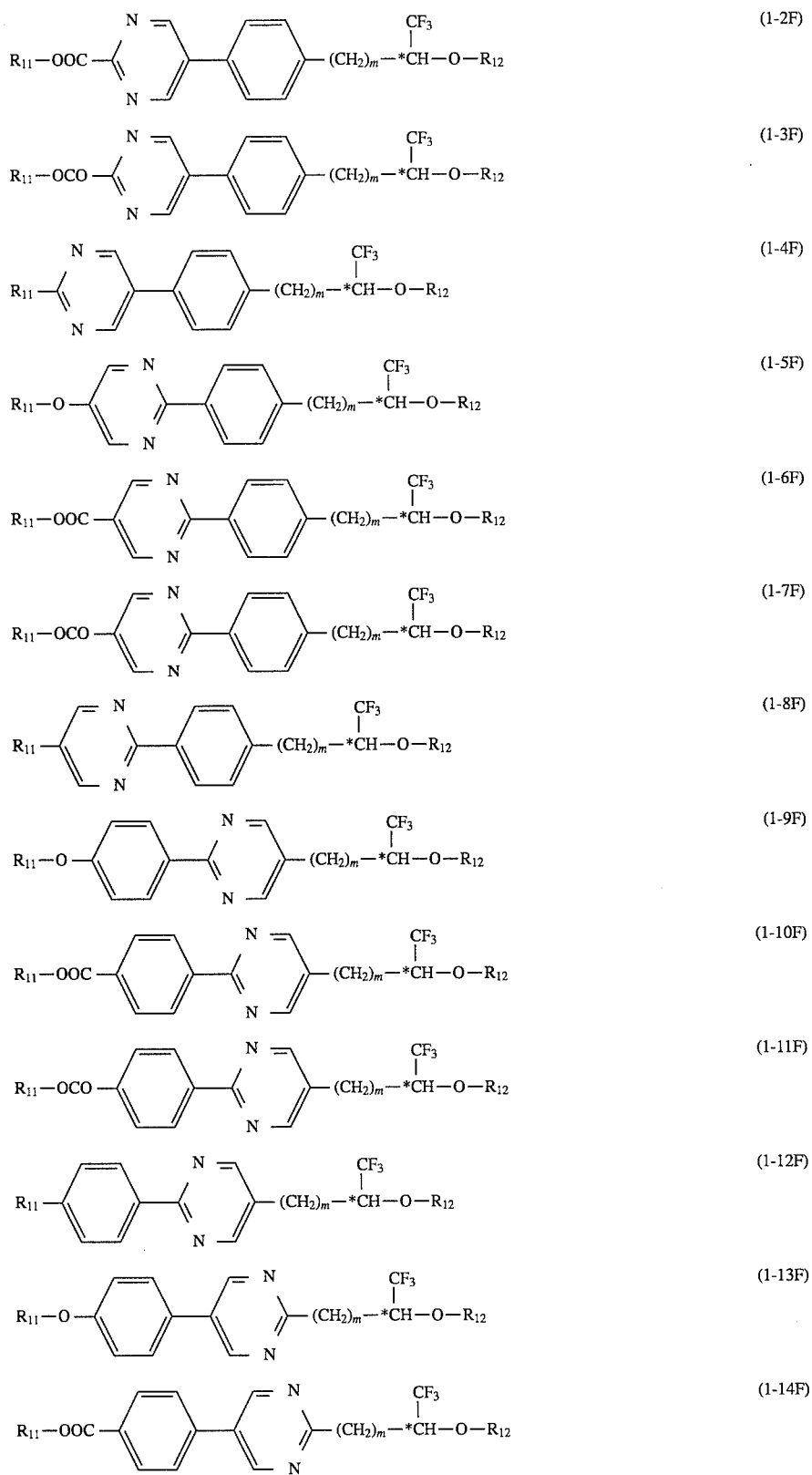

-continued
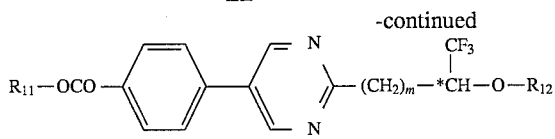 (1-15F)
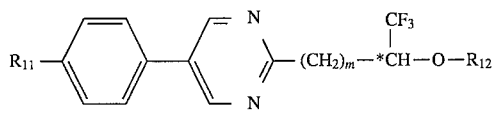 (1-16F)
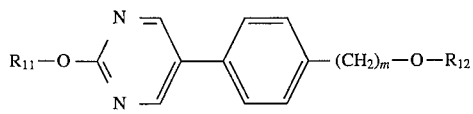 (1-17)
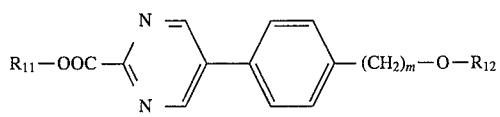 (1-18)
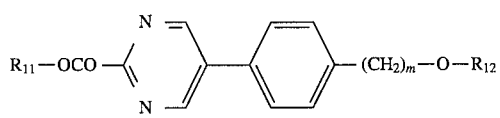 (1-19)
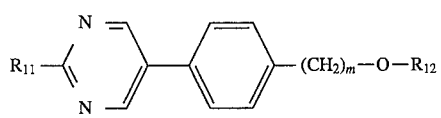 (1-20)
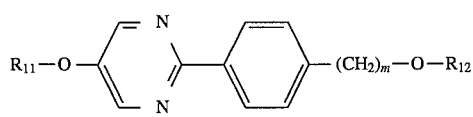 (1-21)
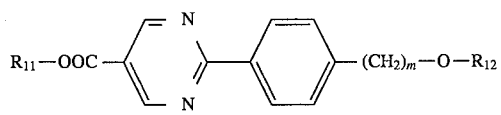 (1-22)
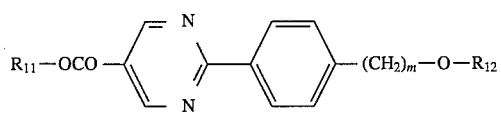 (1-23)
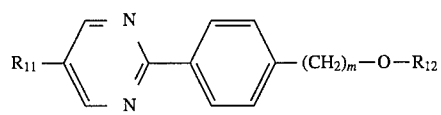 (1-24)
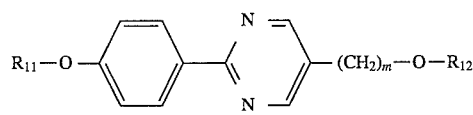 (1-25)
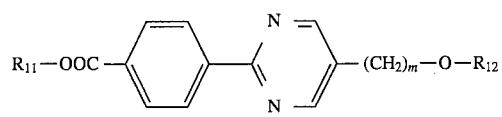 (1-26)
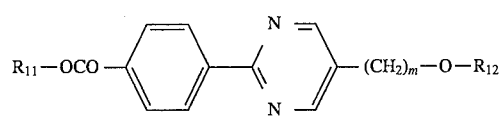 (1-27)
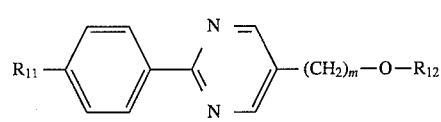 (1-28)

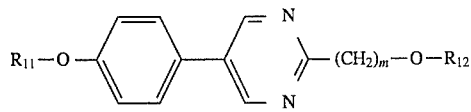
(1-29)
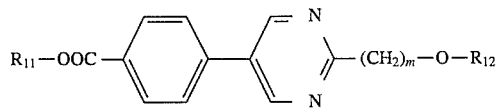
(1-30)
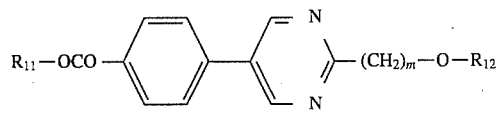
(1-31)
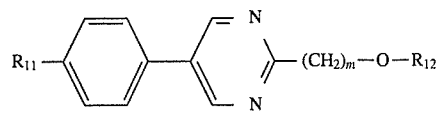
(1-32)
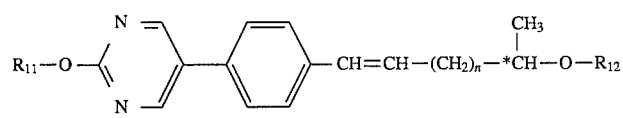
(1-33H)
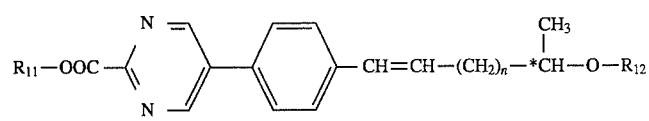
(1-34H)
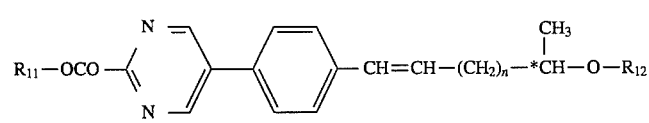
(1-35H)
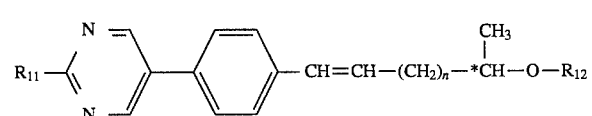
(1-36H)
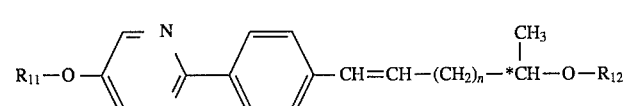
(1-37H)
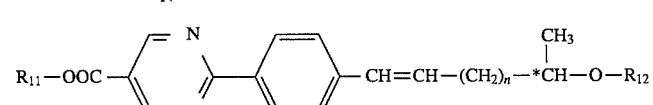
(1-38H)
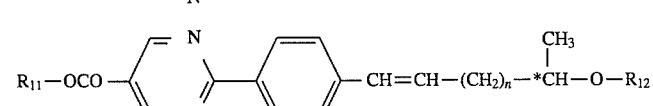
(1-39H)
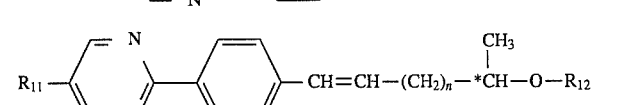
(1-40H)
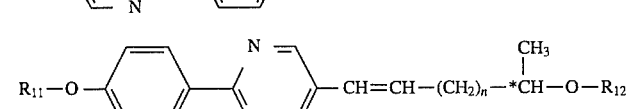
(1-41H)

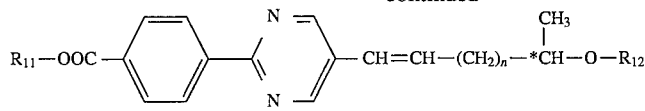 (1-42H)
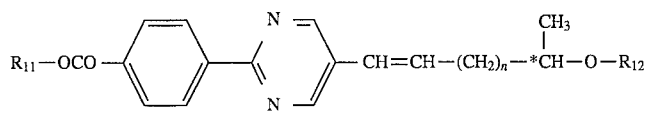 (1-43H)
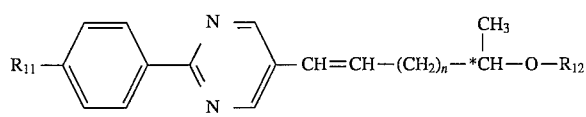 (1-44H)
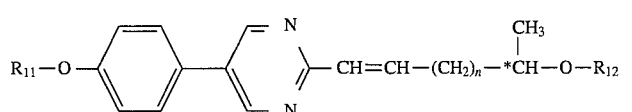 (1-45H)
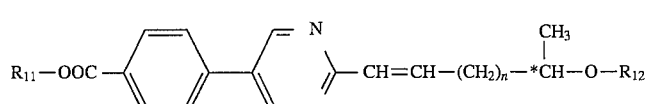 (1-46H)
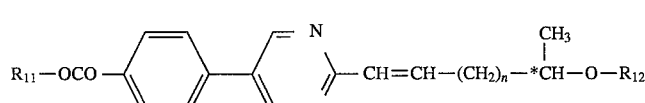 (1-47H)
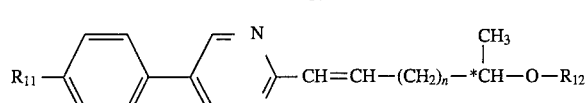 (1-48H)
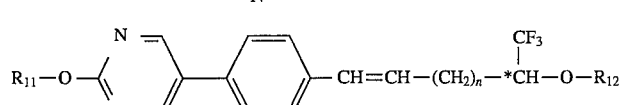 (1-33F)
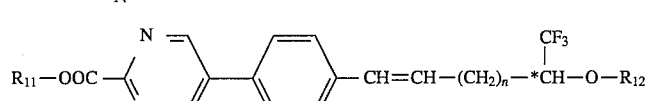 (1-34F)
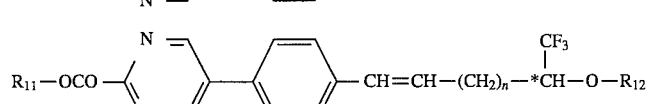 (1-35F)
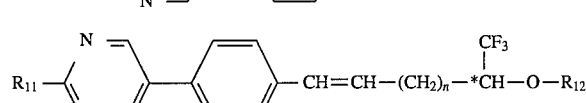 (1-36F)
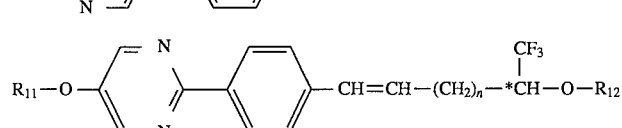 (1-37F)
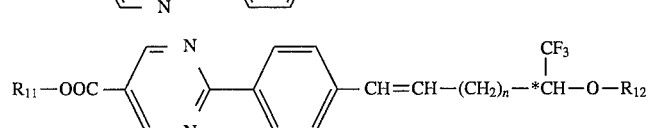 (1-38F)
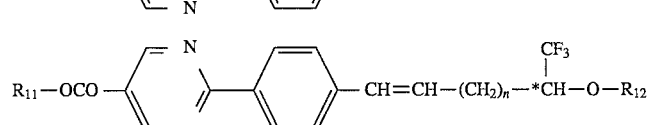 (1-39F)

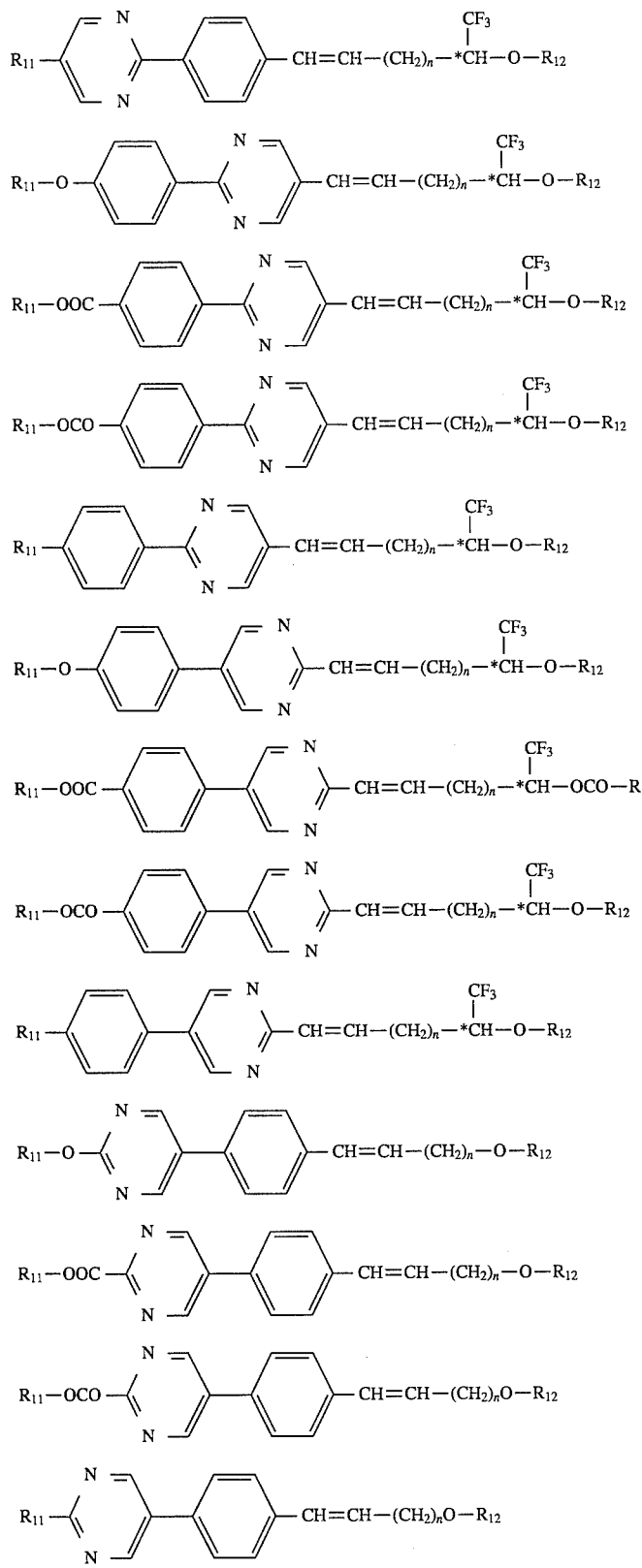

-continued
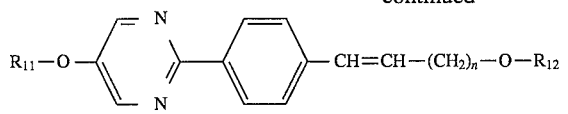 (1-53)
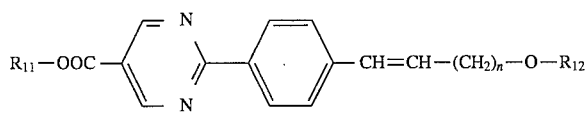 (1-54)
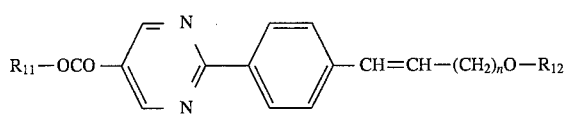 (1-55)
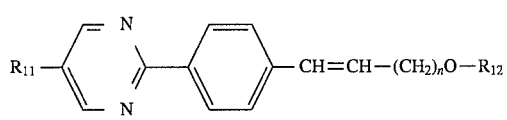 (1-56)
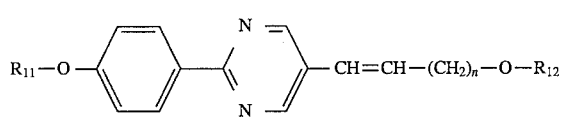 (1-57)
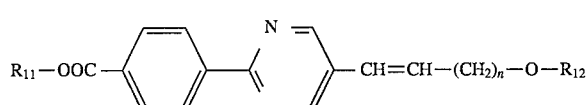 (1-58)
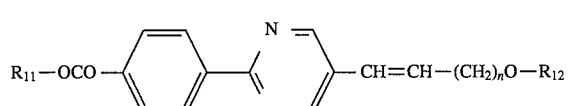 (1-59)
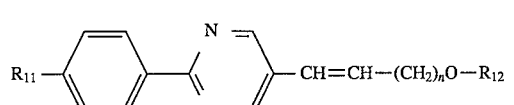 (1-60)
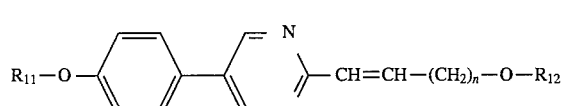 (1-61)
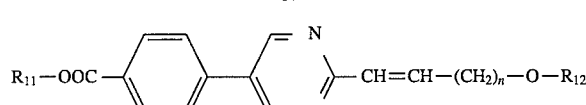 (1-62)
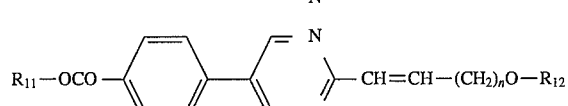 (1-63)
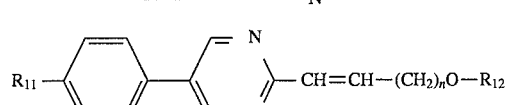 (1-64)
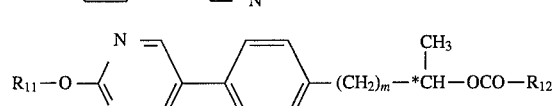 (1-65H)
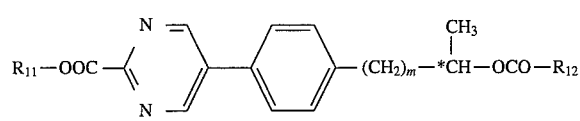 (1-66H)

-continued
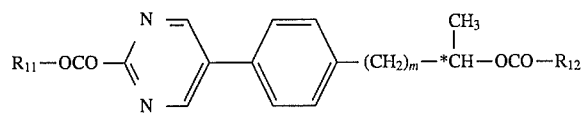 (1-67H)
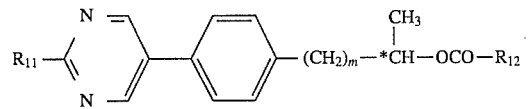 (1-68H)
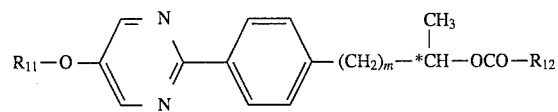 (1-69H)
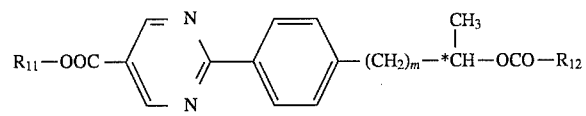 (1-70H)
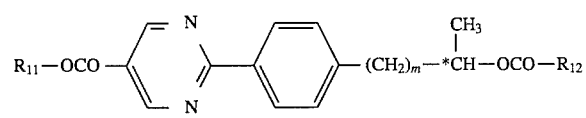 (1-71H)
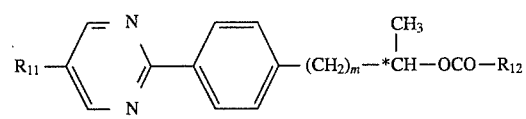 (1-72H)
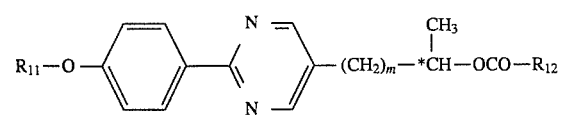 (1-73H)
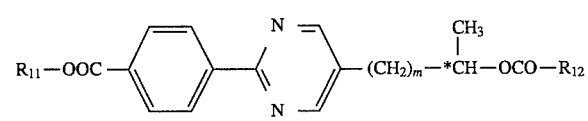 (1-74H)
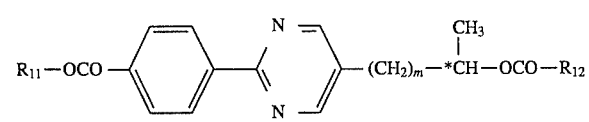 (1-75H)
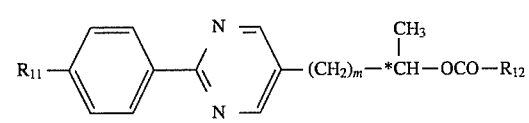 (1-76H)
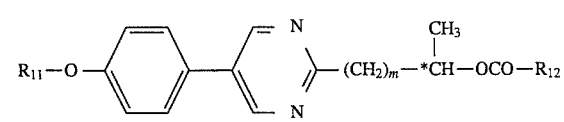 (1-77H)
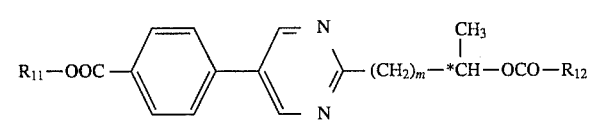 (1-78H)
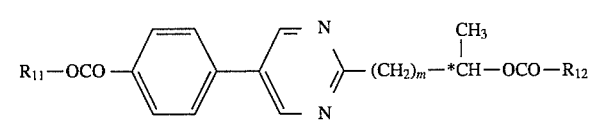 (1-79H)

-continued
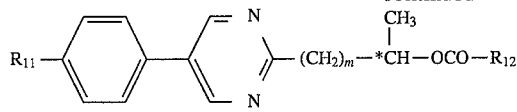 (1-80H)
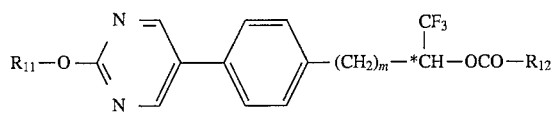 (1-65F)
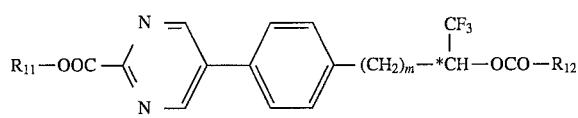 (1-66F)
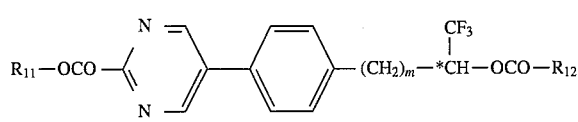 (1-67F)
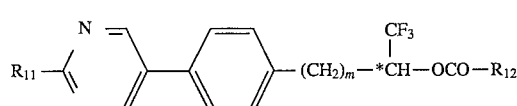 (1-68F)
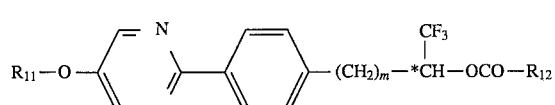 (1-69F)
 (1-70F)
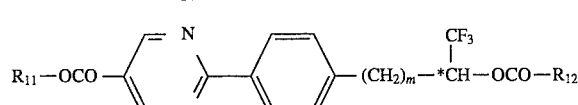 (1-71F)
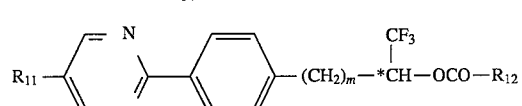 (1-72F)
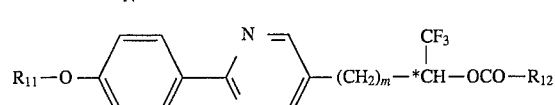 (1-73F)
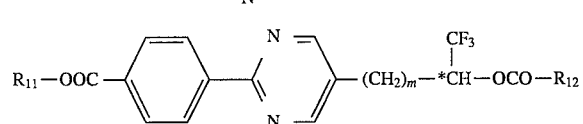 (1-74F)
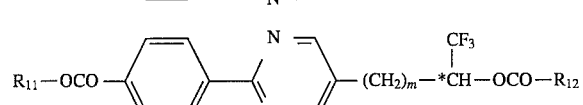 (1-75F)
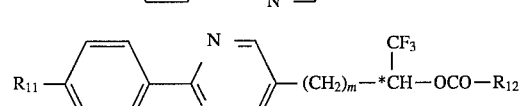 (1-76F)
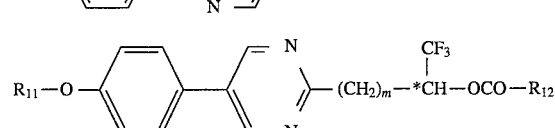 (1-77F)

-continued
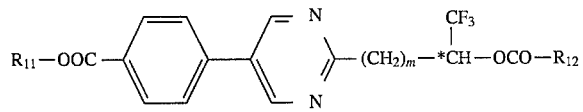
(1-78F)
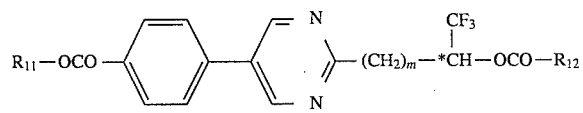
(1-79F)
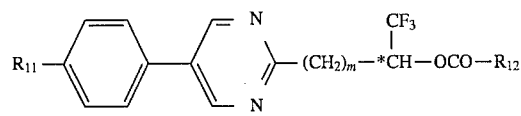
(1-80F)
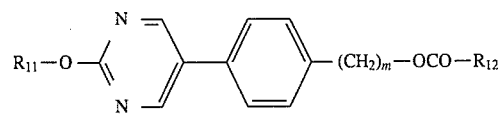
(1-81)
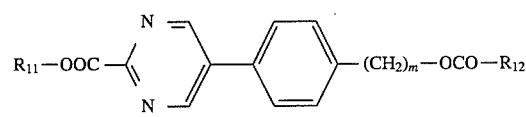
(1-82)
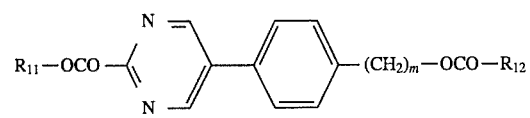
(1-83)
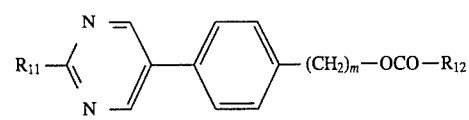
(1-84)
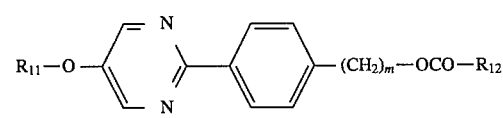
(1-85)
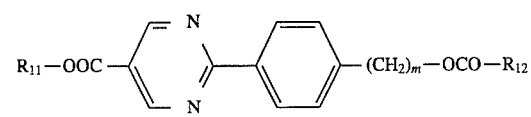
(1-86)
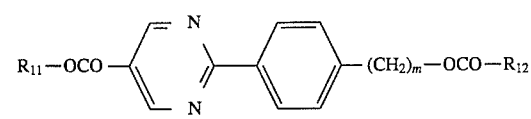
(1-87)
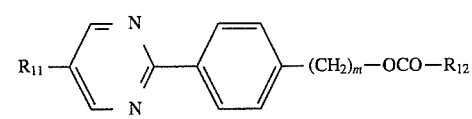
(1-88)
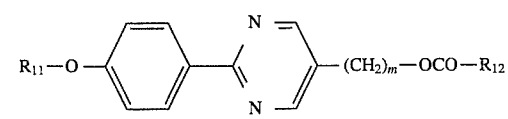
(1-89)
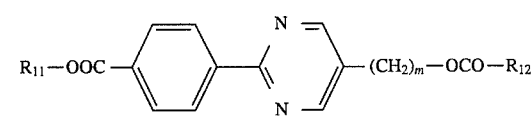
(1-90)

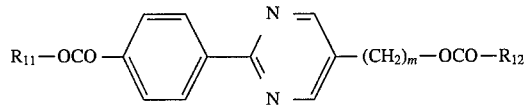 (1-91)
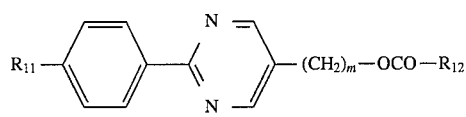 (1-92)
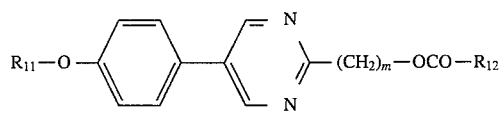 (1-93)
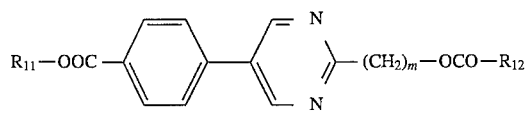 (1-94)
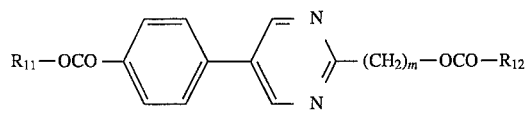 (1-95)
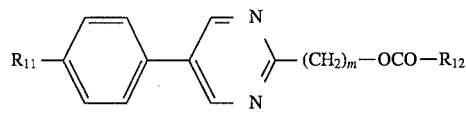 (1-96)
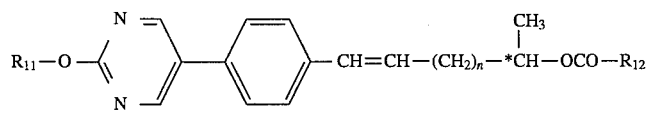 (1-97H)
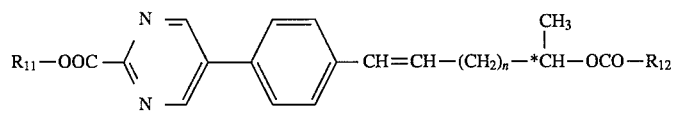 (1-98H)
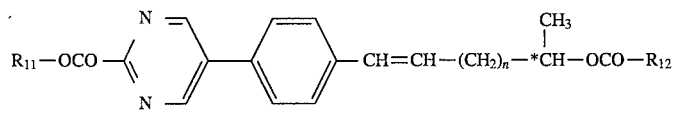 (1-99H)
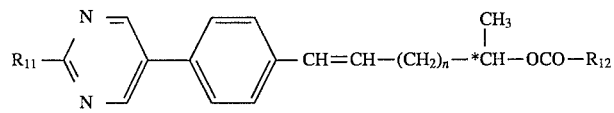 (1-100H)
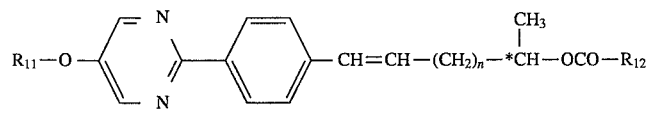 (1-101H)
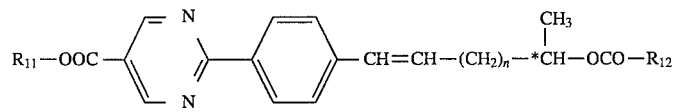 (1-102H)
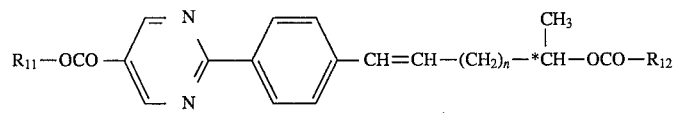 (1-103H)
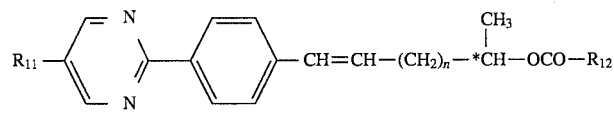 (1-104H)

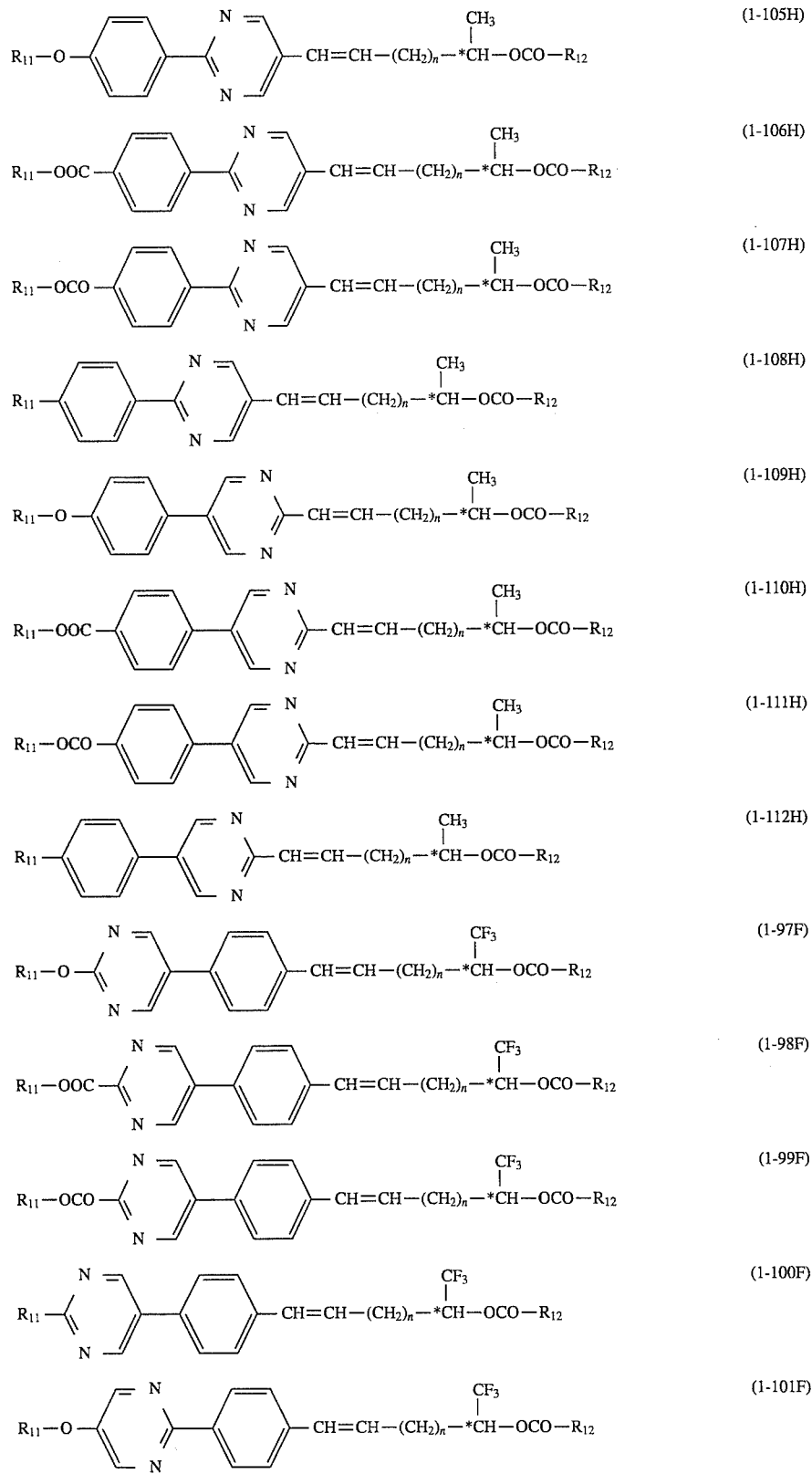

-continued
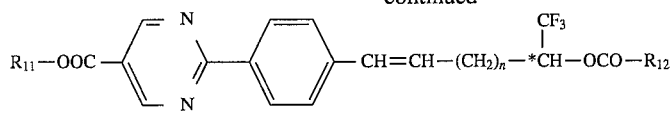 (1-102F)
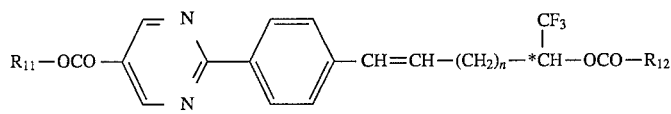 (1-103F)
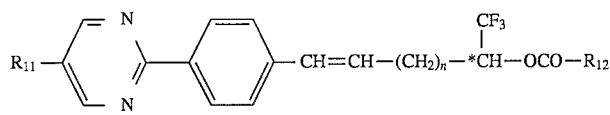 (1-104F)
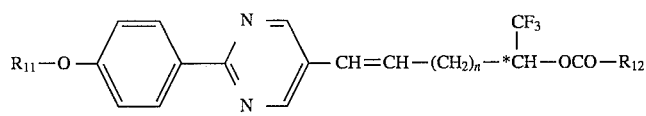 (1-105F)
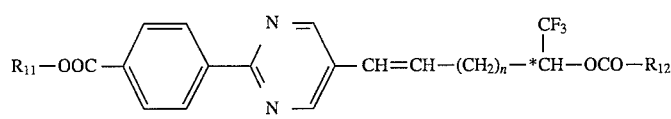 (1-106F)
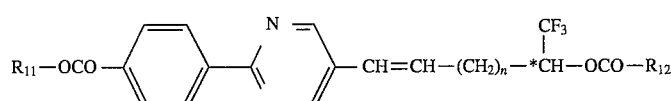 (1-107F)
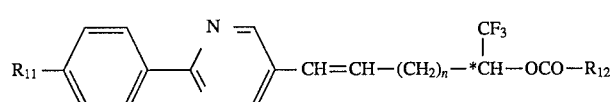 (1-108F)
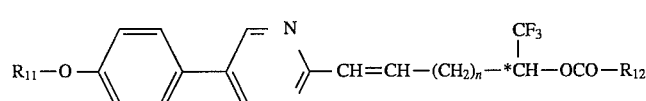 (1-109F)
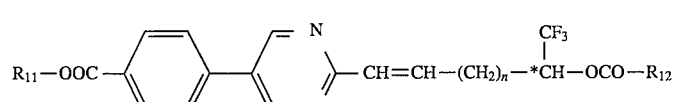 (1-110F)
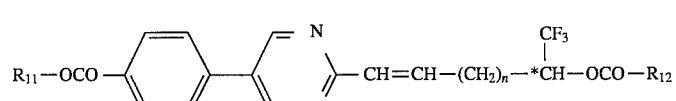 (1-111F)
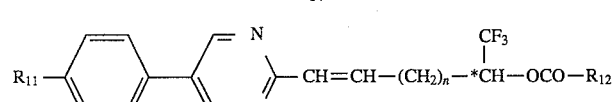 (1-112F)
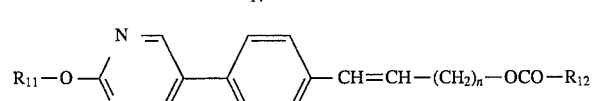 (1-113)
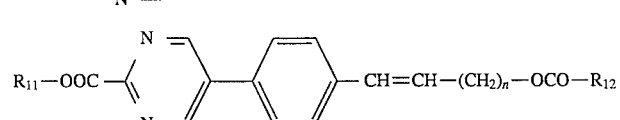 (1-114)
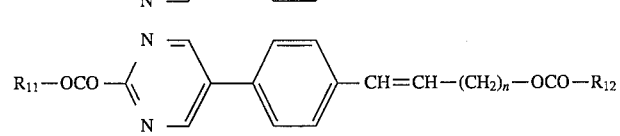 (1-115)

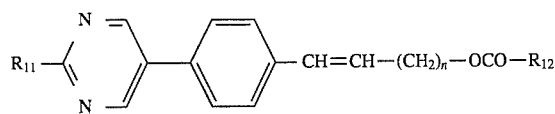 (1-116)
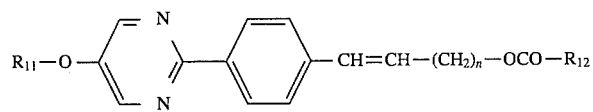 (1-117)
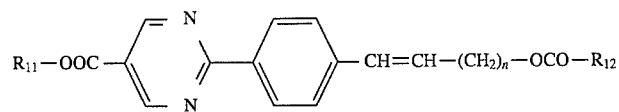 (1-118)
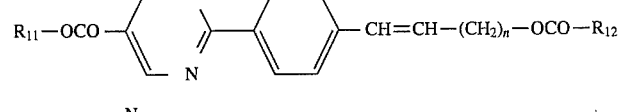 (1-119)
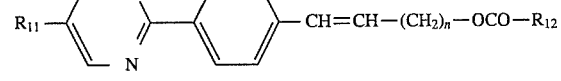 (1-120)
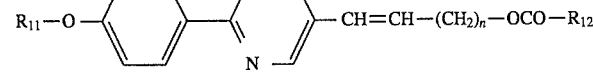 (1-121)
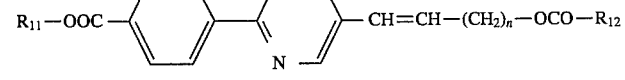 (1-122)
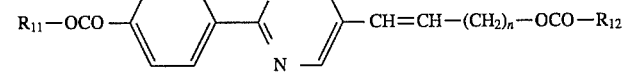 (1-123)
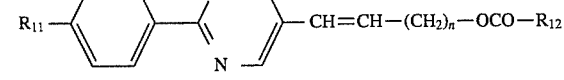 (1-124)
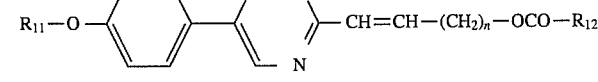 (1-125)
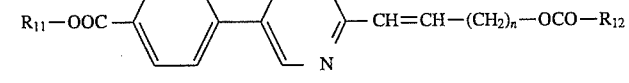 (1-126)
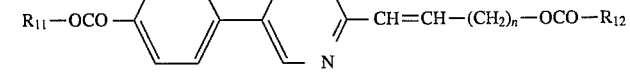 (1-127)
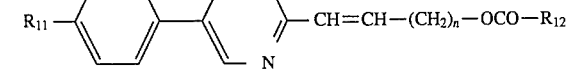 (1-128)

-continued
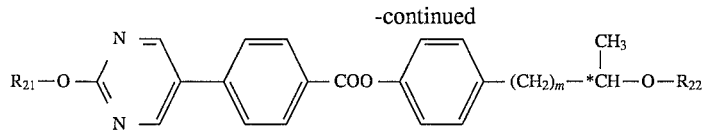 (2-1H)
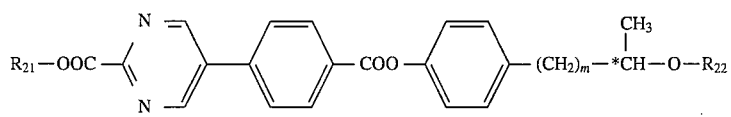 (2-2H)
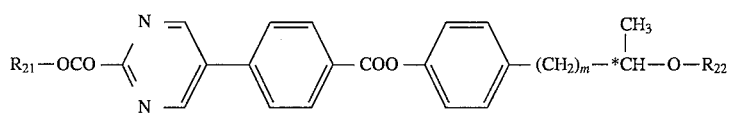 (2-3H)
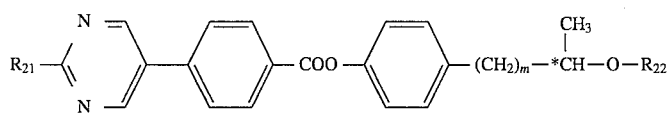 (2-4H)
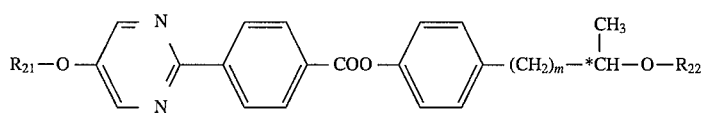 (2-5H)
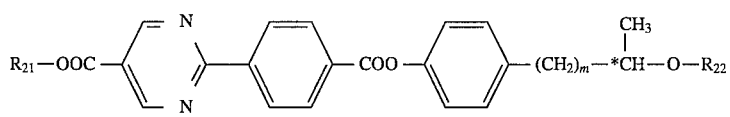 (2-6H)
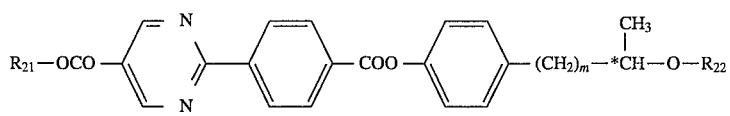 (2-7H)
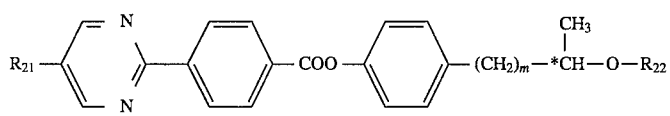 (2-8H)
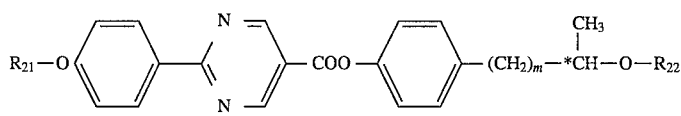 (2-9H)
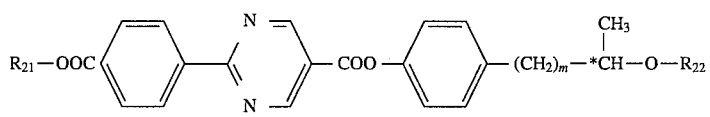 (2-10H)
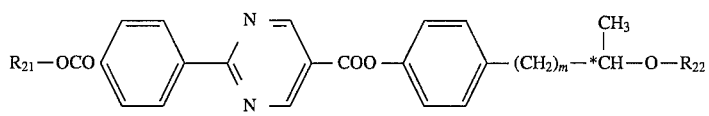 (2-11H)
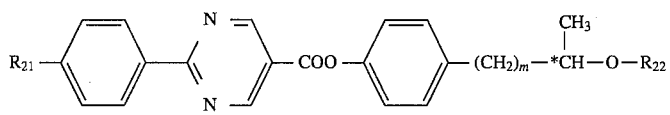 (2-12H)
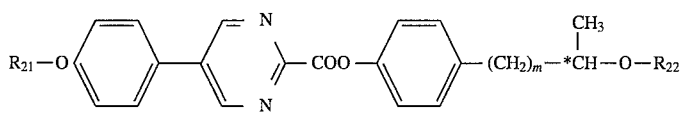 (2-13H)
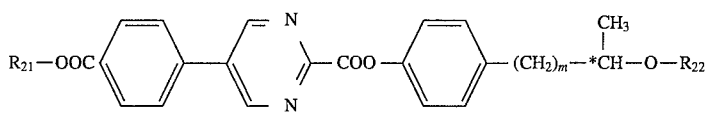 (2-14H)

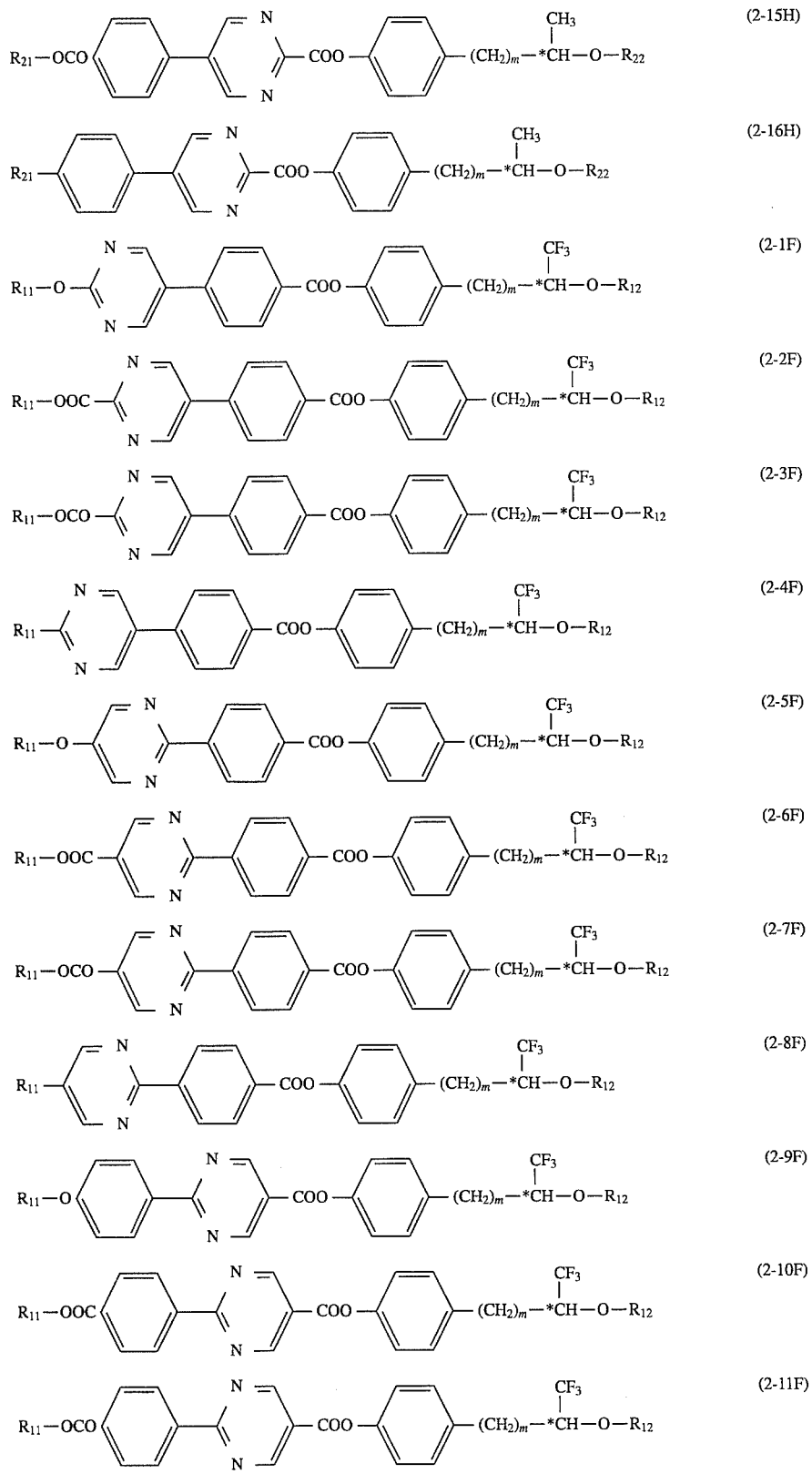

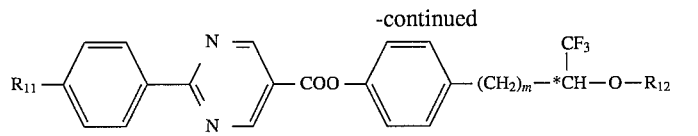 (2-12F)
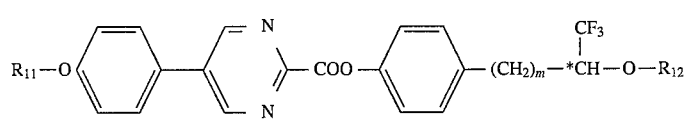 (2-13F)
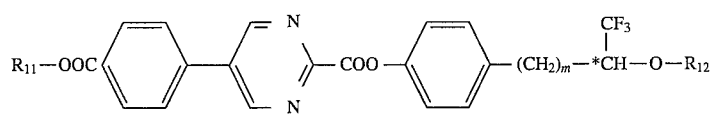 (2-14F)
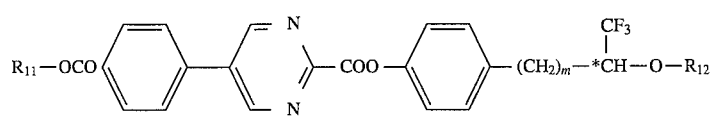 (2-15F)
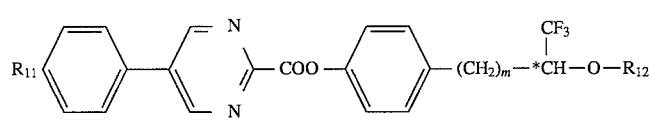 (2-16F)
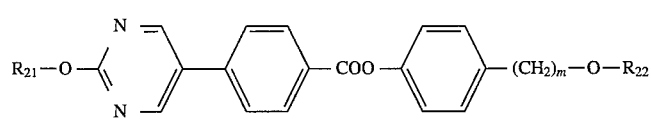 (2-17)
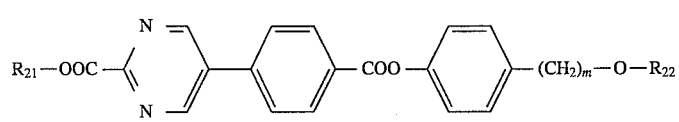 (2-18)
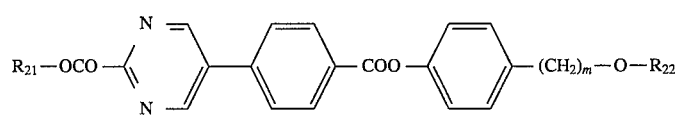 (2-19)
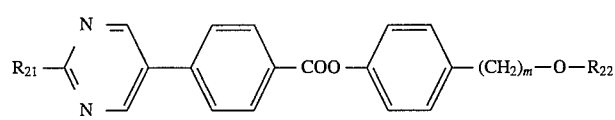 (2-20)
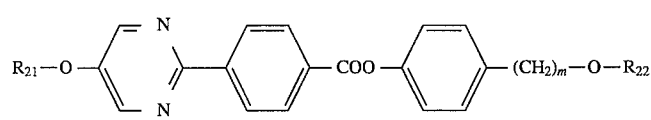 (2-21)
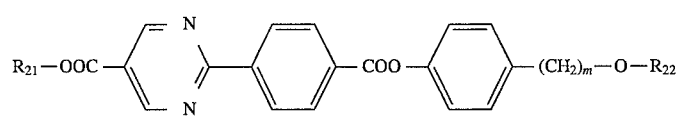 (2-22)
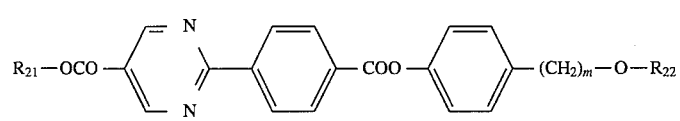 (2-23)
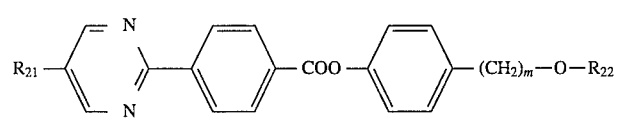 (2-24)
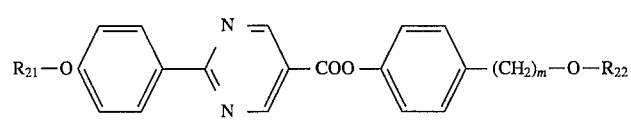 (2-25)

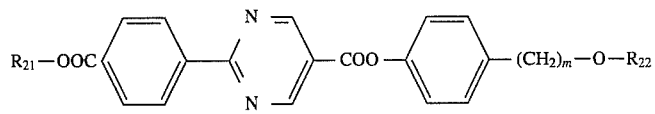
(2-26)
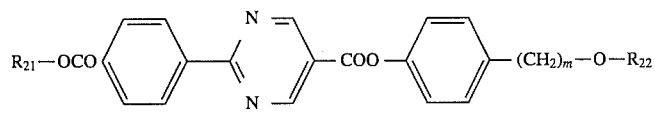
(2-27)
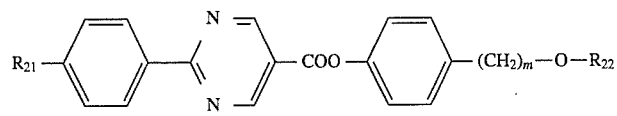
(2-28)
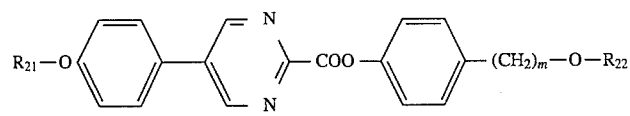
(2-29)
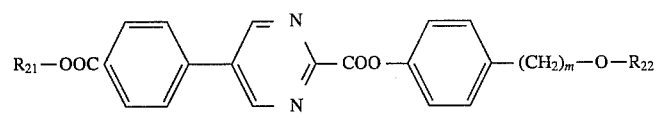
(2-30)
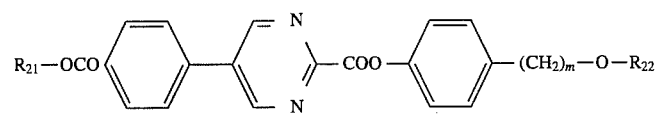
(2-31)
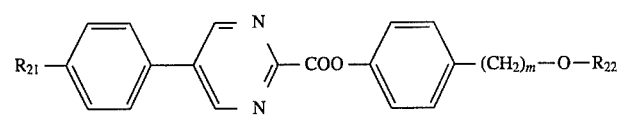
(2-32)
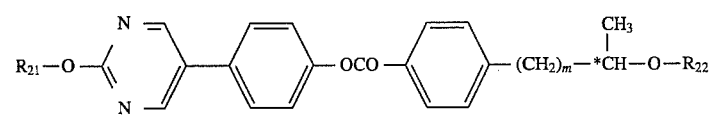
(2-33H)
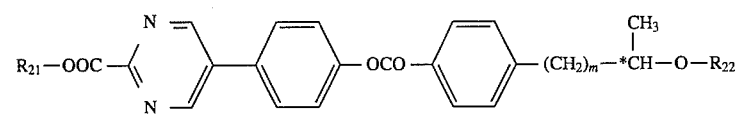
(2-34H)
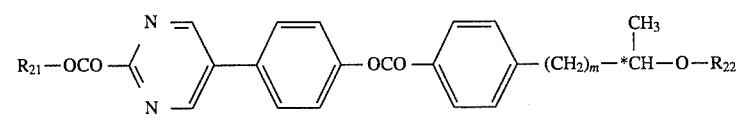
(2-35H)
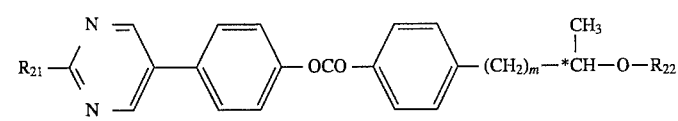
(2-36H)
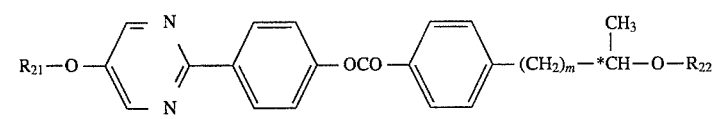
(2-37H)
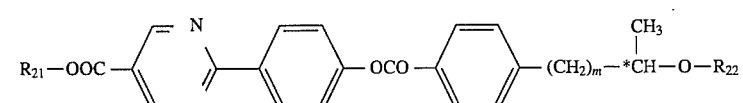
(2-38H)

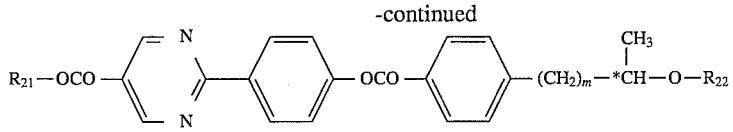 (2-39H)
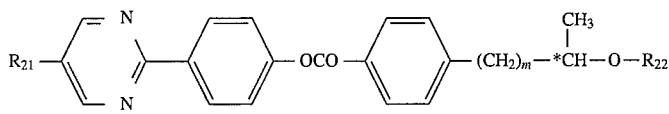 (2-40H)
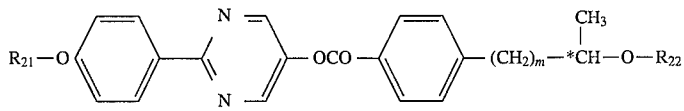 (2-41H)
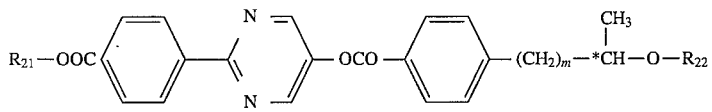 (2-42H)
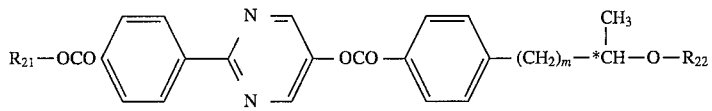 (2-43H)
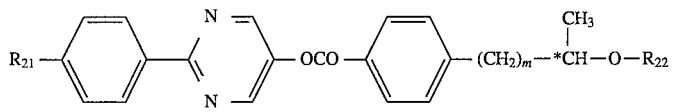 (2-44H)
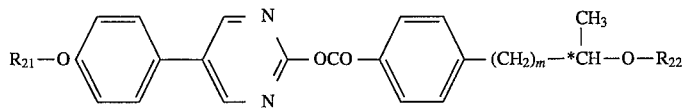 (2-45H)
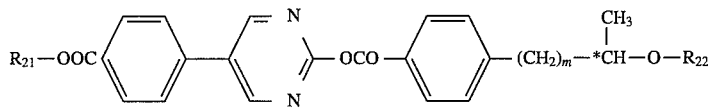 (2-46H)
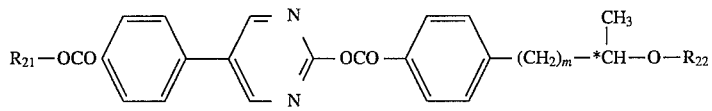 (2-47H)
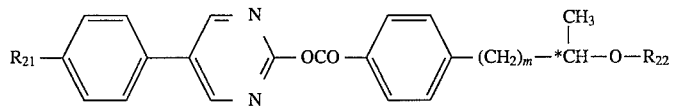 (2-48H)
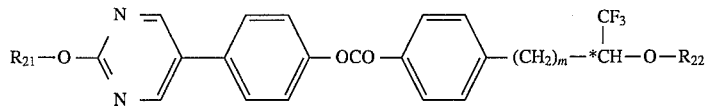 (2-33F)
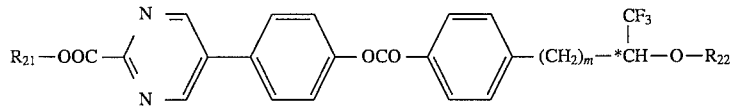 (2-34F)
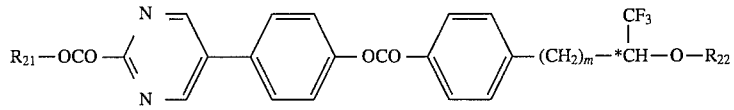 (2-35F)
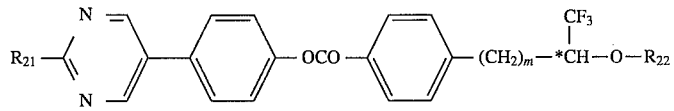 (2-36F)

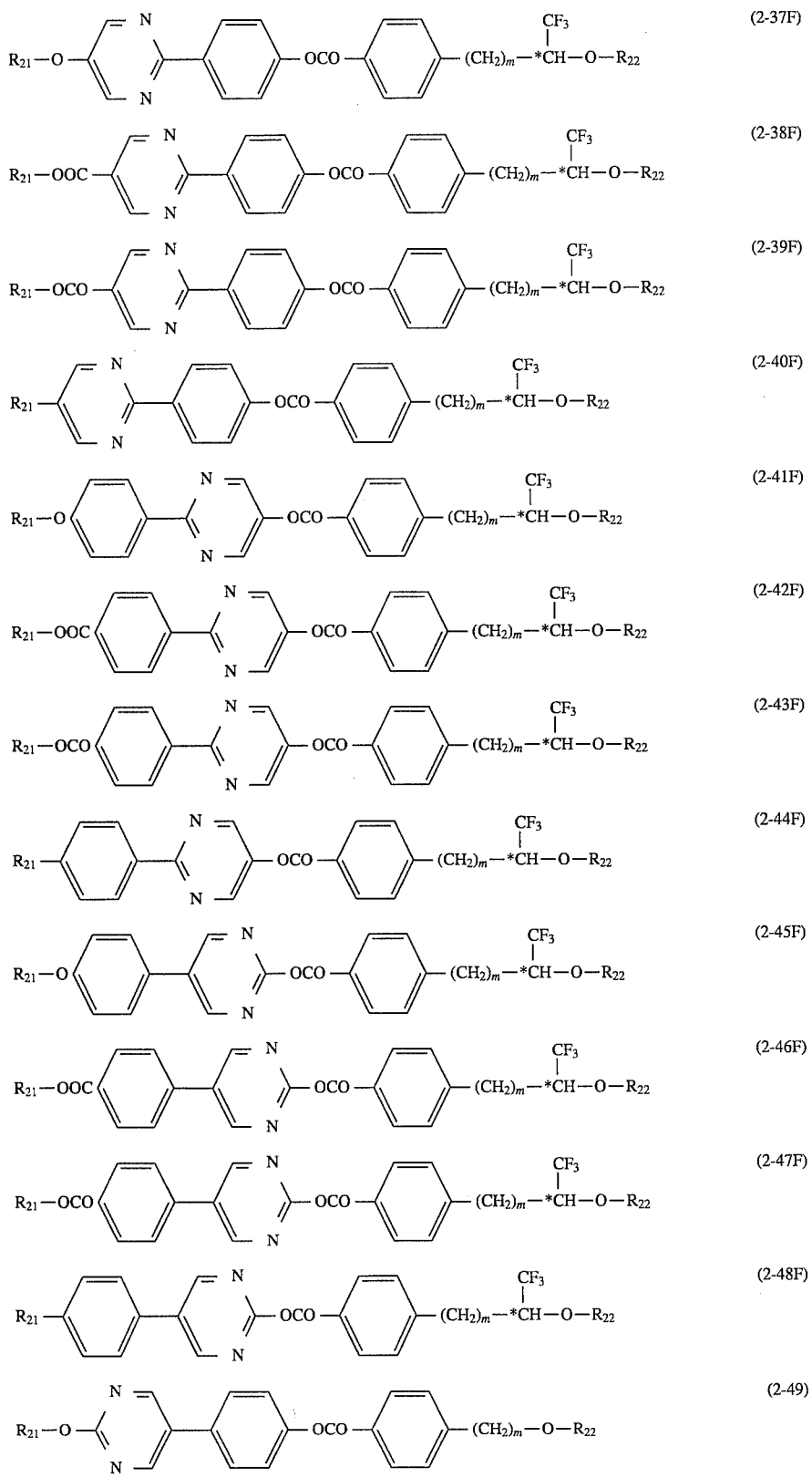

-continued
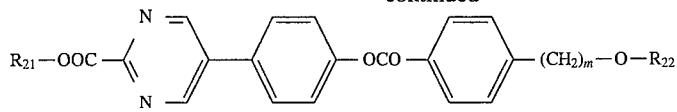
(2-50)
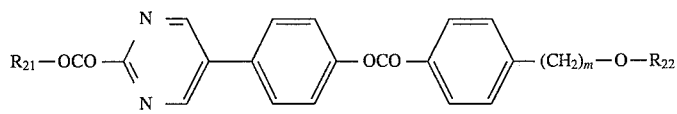
(2-51)
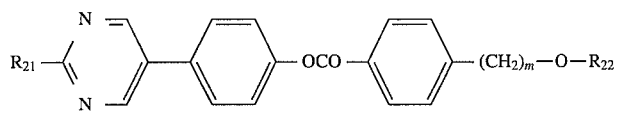
(2-52)
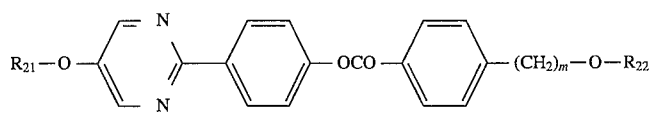
(2-53)
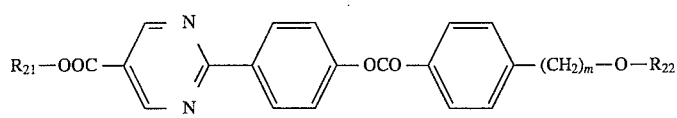
(2-54)
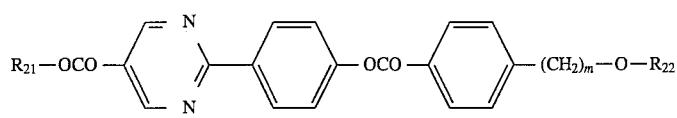
(2-55)
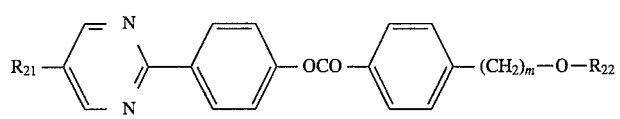
(2-56)
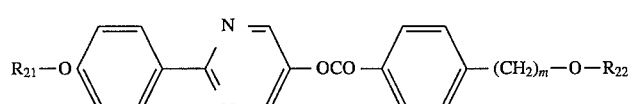
(2-57)
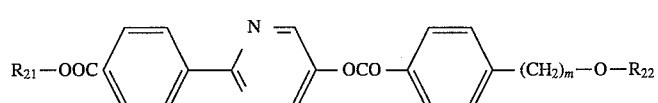
(2-58)
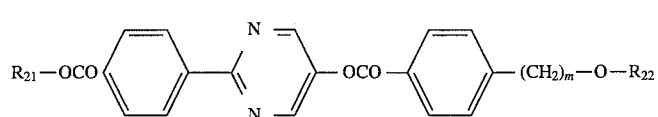
(2-59)
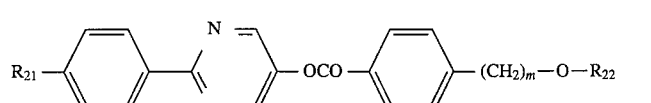
(2-60)
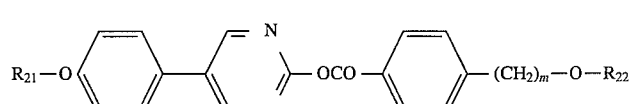
(2-61)
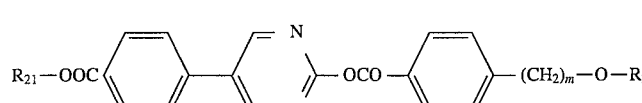
(2-62)
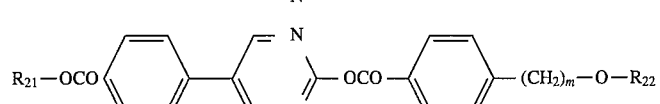
(2-63)

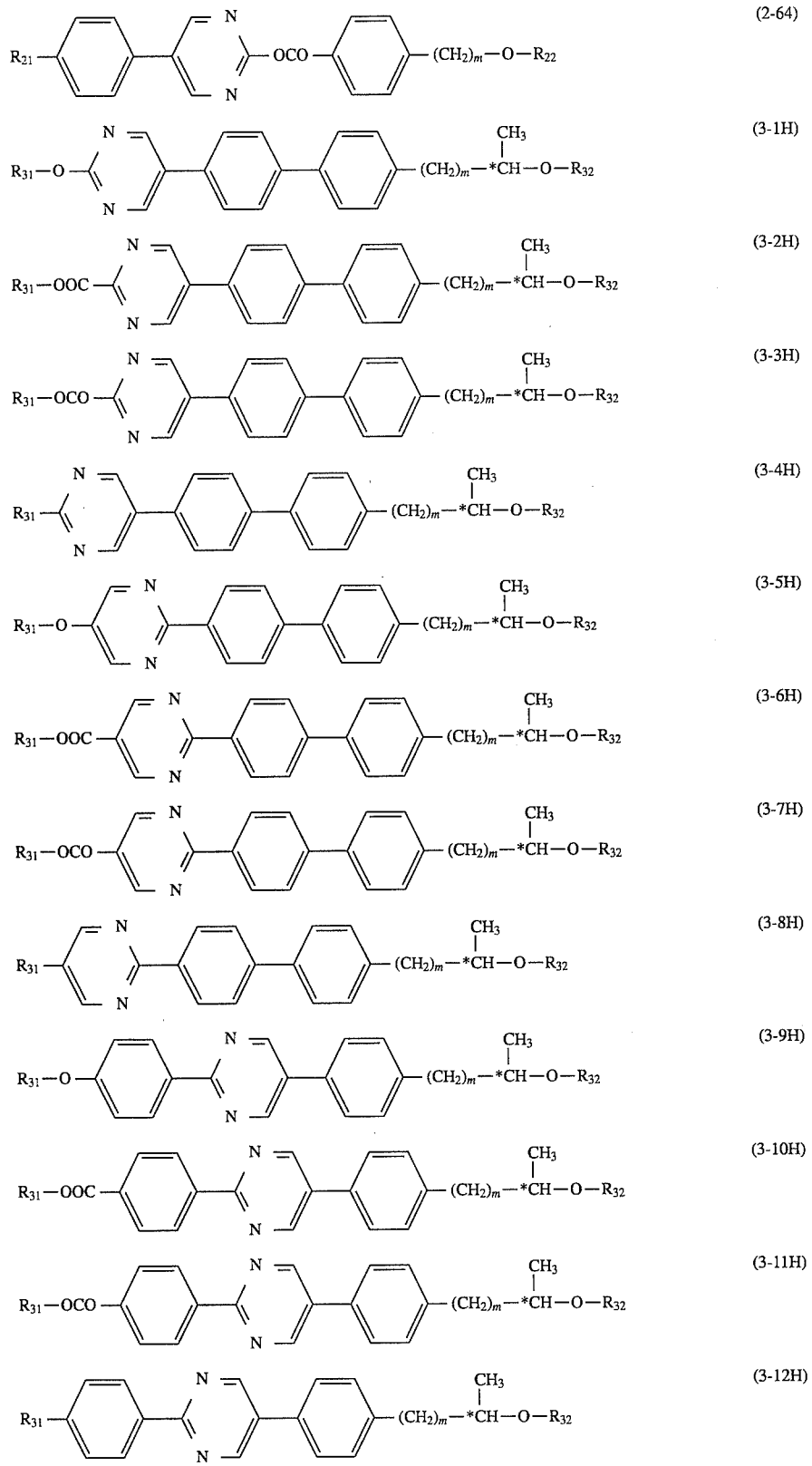

-continued
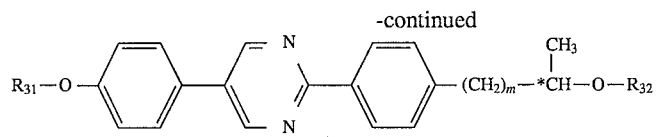  (3-13H)
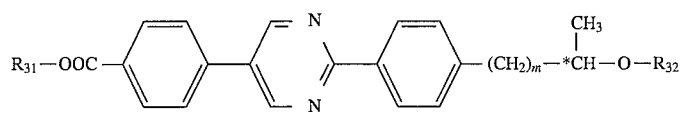  (3-14H)
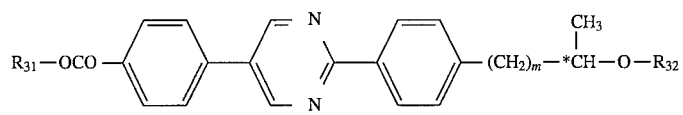  (3-15H)
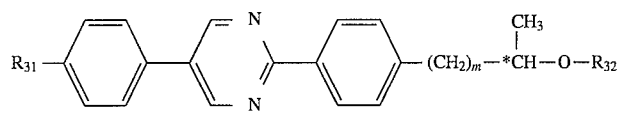  (3-16H)
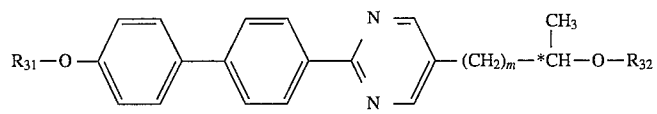  (3-17H)
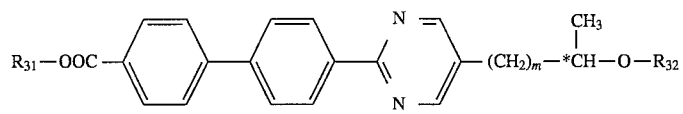  (3-18H)
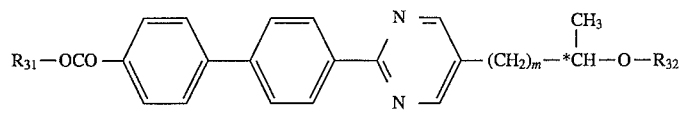  (3-19H)
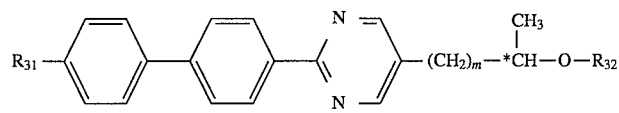  (3-20H)
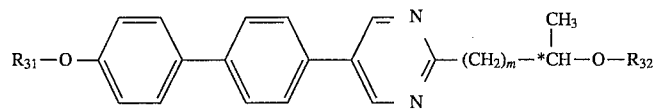  (3-21H)
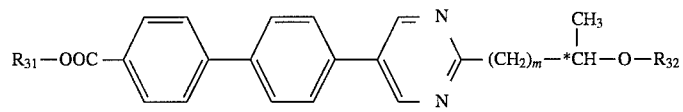  (3-22H)
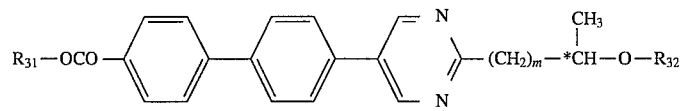  (3-23H)
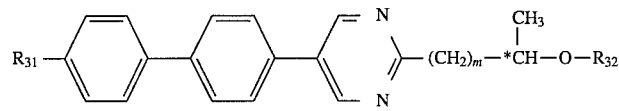  (3-24H)
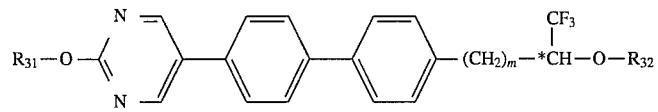  (3-1F)
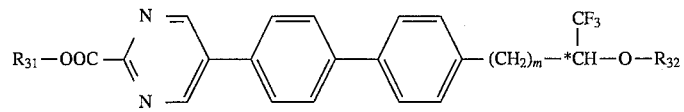  (3-2F)

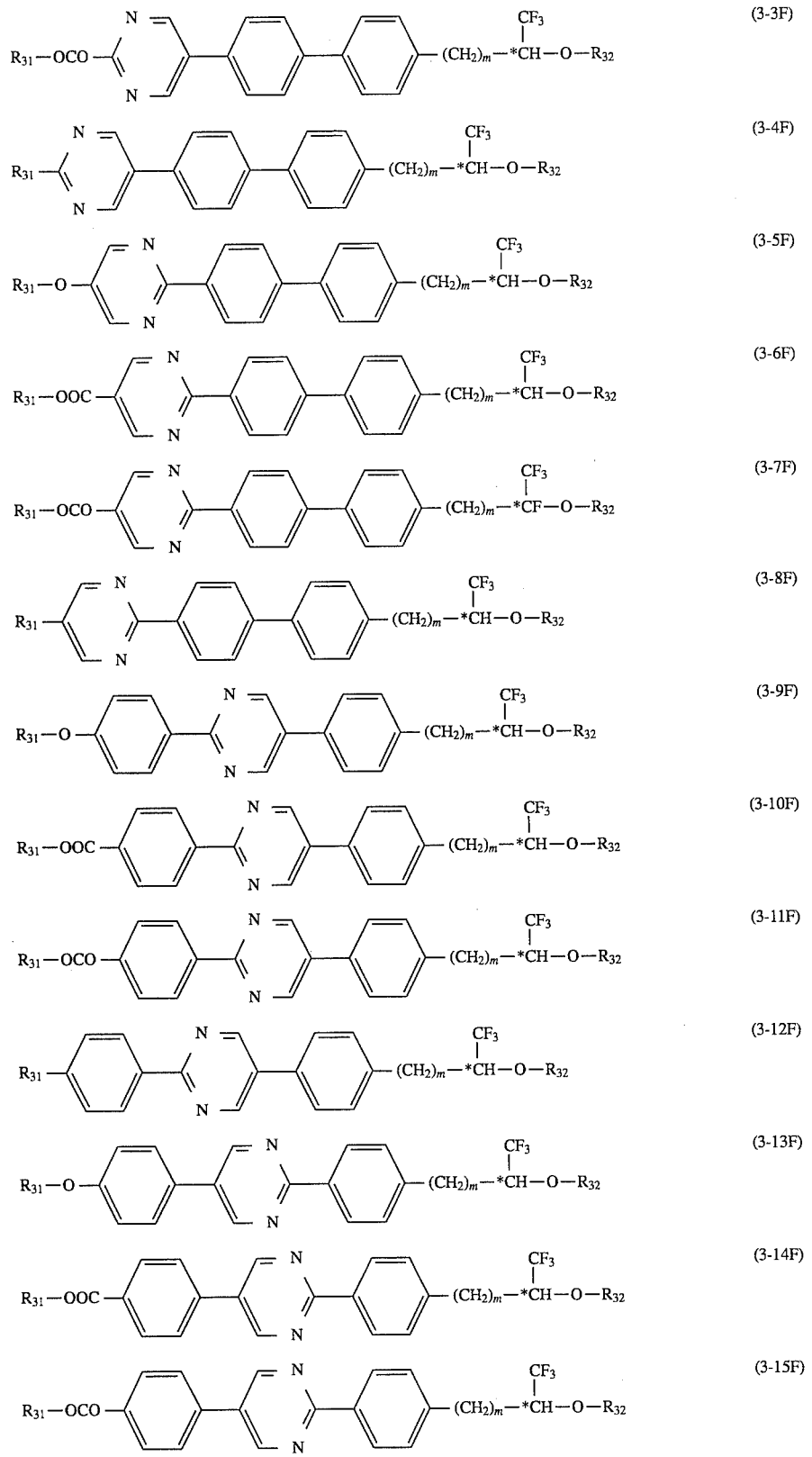

-continued
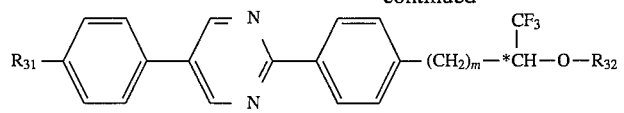 (3-16F)
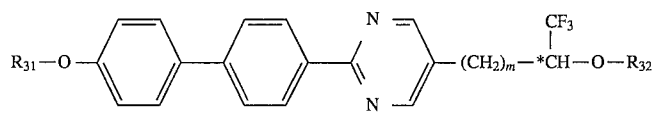 (3-17F)
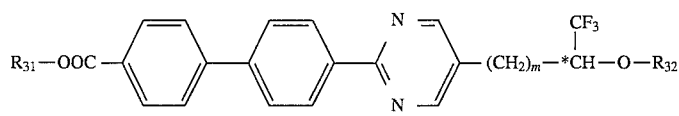 (3-18F)
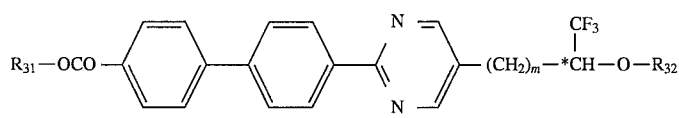 (3-19F)
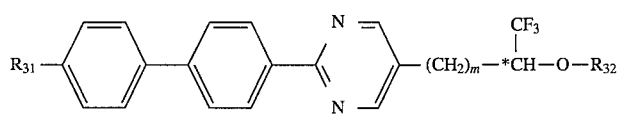 (3-20F)
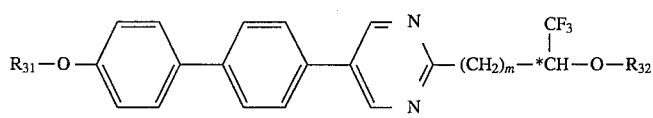 (3-21F)
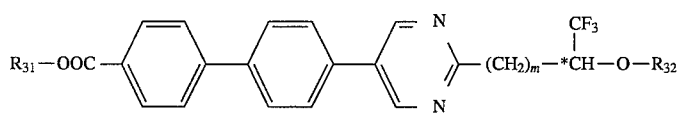 (3-22F)
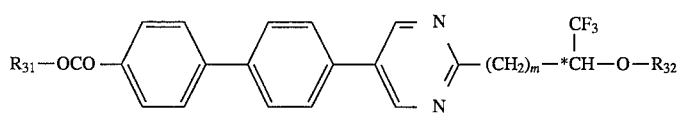 (3-23F)
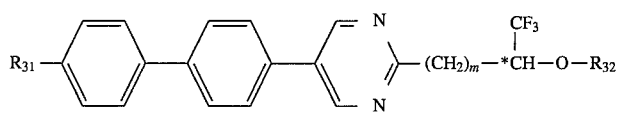 (3-24F)
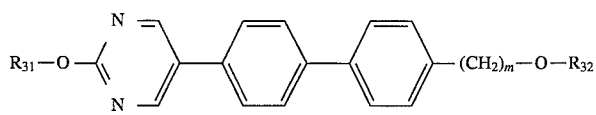 (3-25)
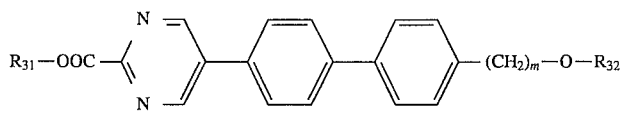 (3-26)
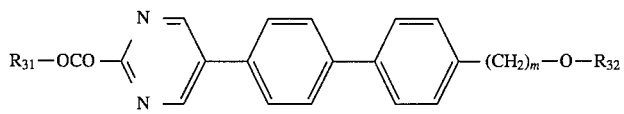 (3-27)
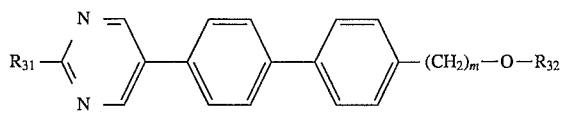 (3-28)
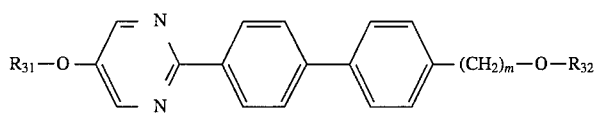 (3-29)

-continued
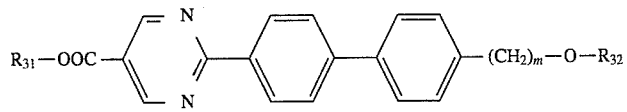
(3-30)
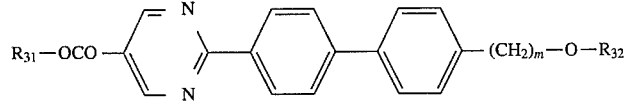
(3-31)
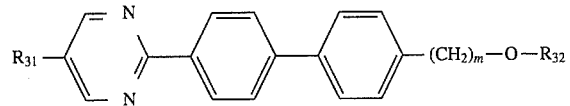
(3-32)
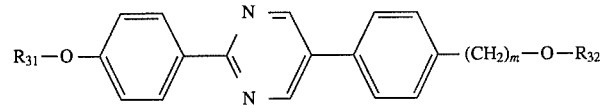
(3-33)
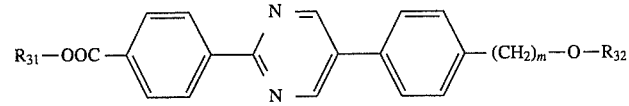
(3-34)
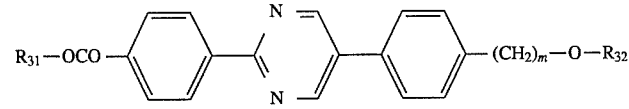
(3-35)
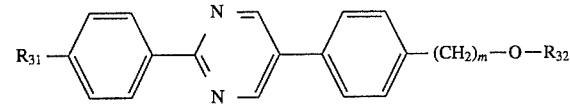
(3-36)
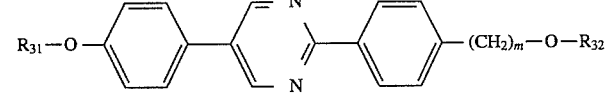
(3-37)
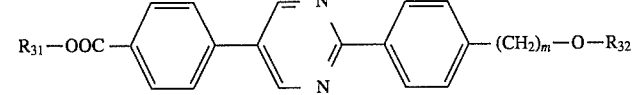
(3-38)
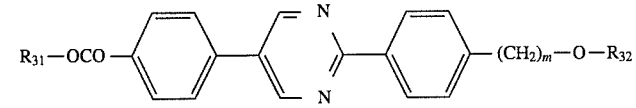
(3-39)
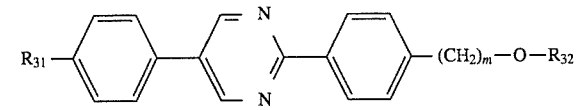
(3-40)
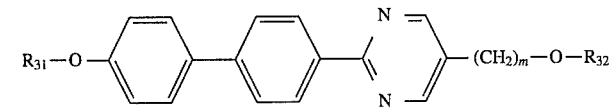
(3-41)
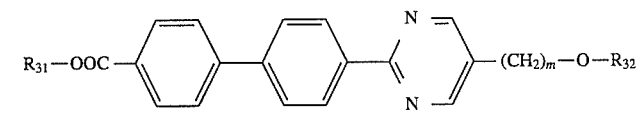
(3-42)

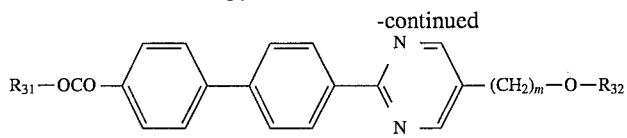 (3-43)
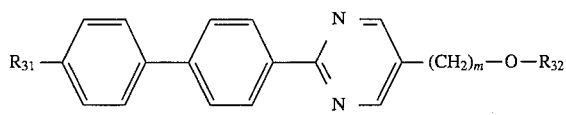 (3-44)
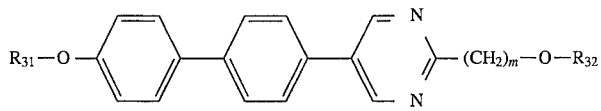 (3-45)
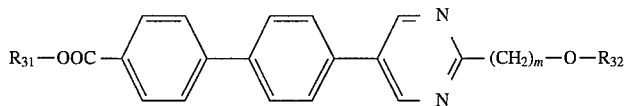 (3-46)
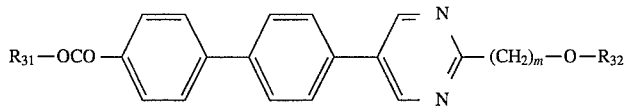 (3-47)
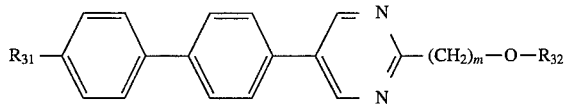 (3-48)
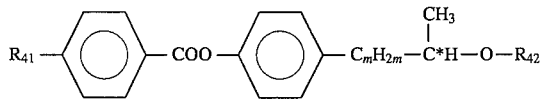 (4-1H)
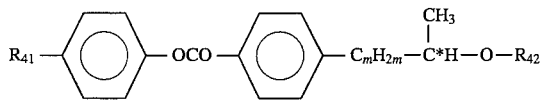 (4-2H)
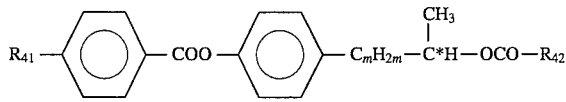 (4-3H)
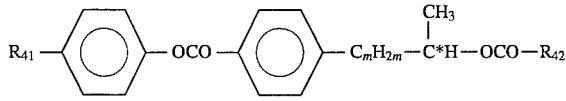 (4-4H)
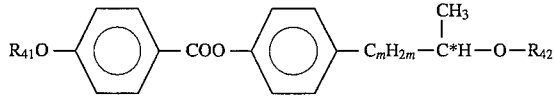 (4-5H)
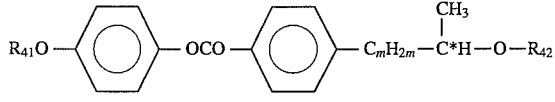 (4-6H)
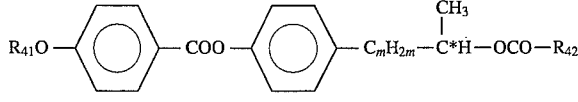 (4-7H)
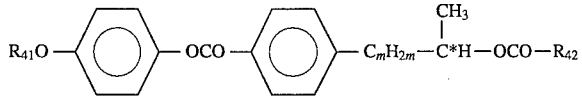 (4-8H)

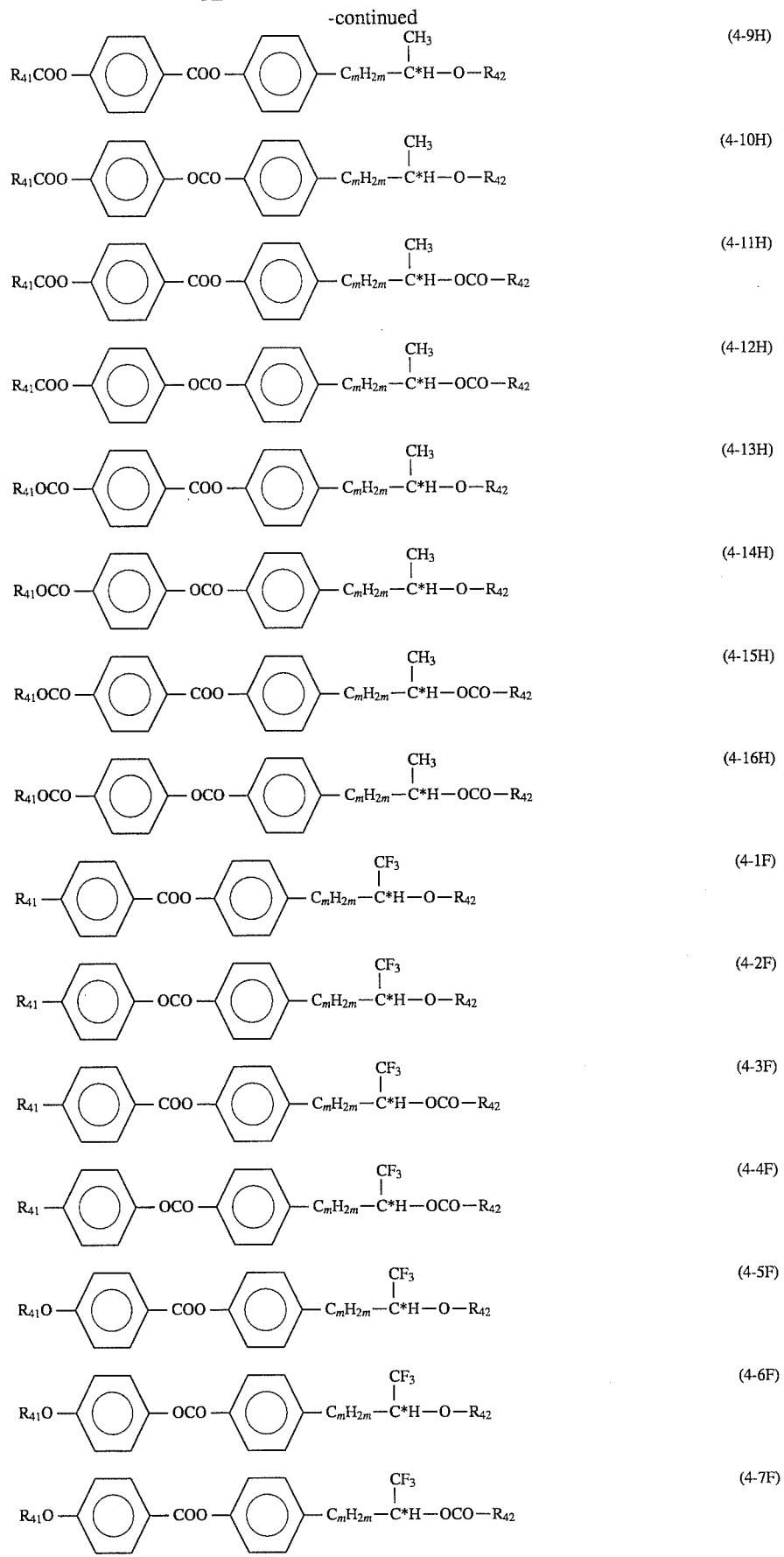

-continued

(4-8F)

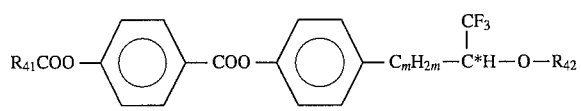
(4-9F)

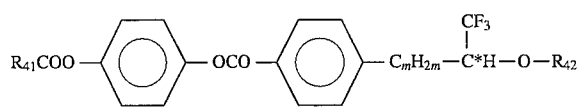
(4-10F)

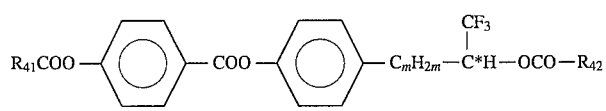
(4-11F)

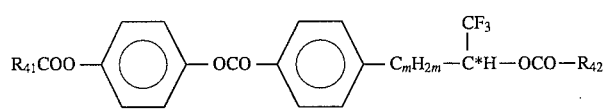
(4-12F)

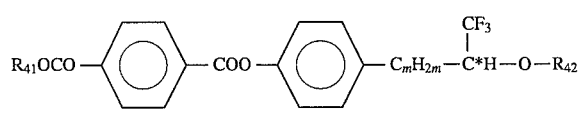
(4-13F)

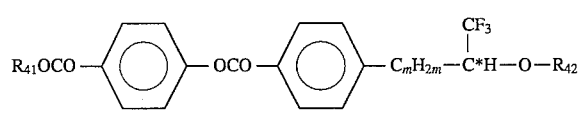
(4-14F)

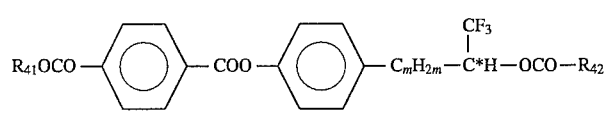
(4-15F)

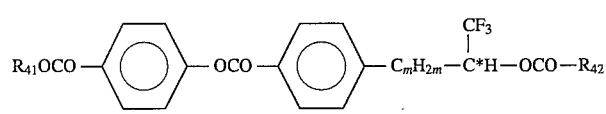
(4-16F)

The ferroelectric chiral smectic liquid crystal mixture of the present invention may optionally contain other liquid crystal compound or a non-liquid crystal compound. Kinds of the other liquid crystal compound and non-liquid crystal compound are not limited. Specific examples of such optional compounds are a compound of the following formula (V) and a compound of the following formula (VI) except the compounds of the formulas (II) and (III).

An amount of the compounds of the formulas (V) and (VI) is not limited, and preferably from 5 to 60% by mole based on the total amount of the liquid crystal mixture.

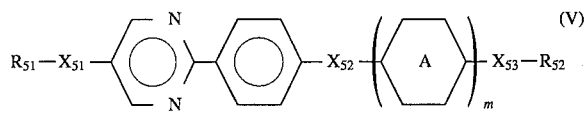
(V)

wherein

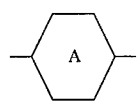

represents

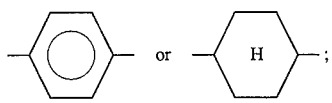

at least one hydrogen atom of the phenylene group may be substituted by a halogen atom, a methyl group or a trifluoromethyl group; m is 0 or 1; $X_{51}$ and $X_{53}$ are independently from each other and a single bond, —O—, —COO—, —OCO— or —OCOO—; $X_{52}$ is a single bond, —COO—, —OCO—, —OCH$_2$— or —CH$_2$O—; $R_{51}$ and $R_{52}$ are independently from each other and a straight or branched alkyl group having 1 to 18 carbon atoms in which a hydrogen atom of one methylene group or hydrogen atoms of at least two non-vicinal methylene groups in the alkyl group may be substituted by a halogen atom, a methyl group or a trifluoromethyl group; and one methylene group or non-vicinal methylene groups except one directly bonded to $X_{51}$ or $X_{53}$ may be replaced by —O—, —CO—, —COO—, —OCO— or the like, provided that when the hydrogen atom of one methylene group of $R_{51}$ and $R_{52}$ is substituted by the halogen atom, $X_{51}$ and $X_{53}$ are not single bonds.

Specific examples of the compounds of the formula (V) are compounds (5-1) to (5-6):

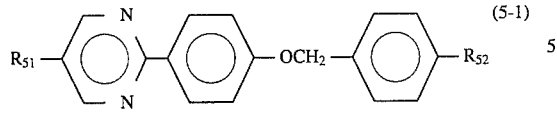
(5-1)

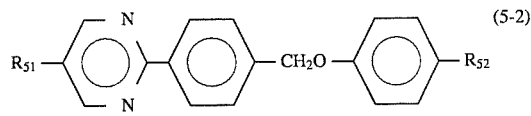
(5-2)

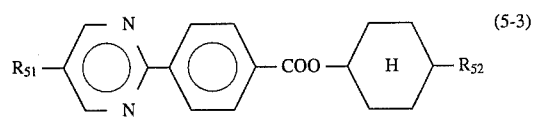
(5-3)

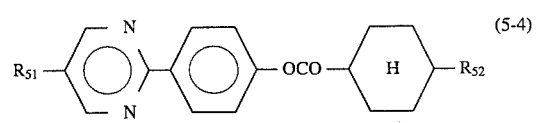
(5-4)

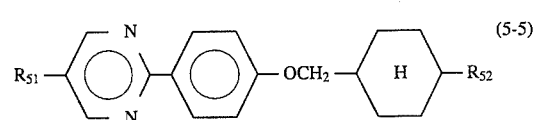
(5-5)

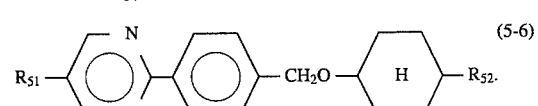
(5-6)

The compound of the formula (VI) is as follow:

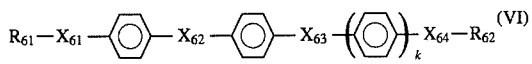
(VI)

wherein at least one hydrogen atom of the phenylene group may be substituted by a halogen atom, a methyl group or a trifluoromethyl group; k is 0 or 1; $X_{61}$ and $X_{64}$ are independently from each other and a single bond, —O—, —COO—, —OCO— or —OCOO—; $X_{62}$ and $X_{63}$ are independently from each other and a single bond, —COO—, —OCO—, —OCH$_2$13 , —CH$_2$O—, —CH$_2$CH$_2$—, —COS—, —SCO—, —(CH$_2$)COS—, —CH$_2$COO— or —CH=CH—COO—; $R_{61}$ and $R_{62}$ are independently from each other and a straight or branched alkyl group having 1 to 18 carbon atoms in which a hydrogen atom of one methylene group or hydrogen atoms of at least two non-vicinal methylene groups in the alkyl group may be substituted by a halogen atom, a methyl group or a trifluoromethyl group; and one methylene group or non-vicinal methylene groups except one directly bonded to $X_{61}$ or $X_{64}$ may be replaced by —O—, —CO—, —COO—, —OCO— or the like, provided that when the hydrogen atom of one methylene group of $R_{61}$ and $R_{62}$ is substituted by the halogen atom, $X_{61}$ and $X_{64}$ are not single bonds.

Specific examples of the compounds of the formula (VI) are compounds (6-1) to (6-18):

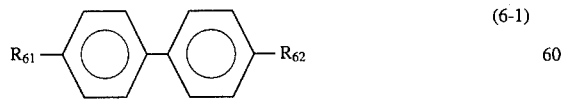
(6-1)

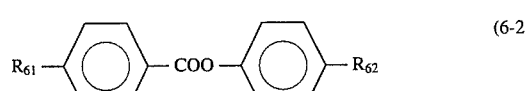
(6-2)

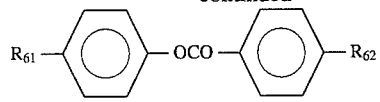
(6-3)

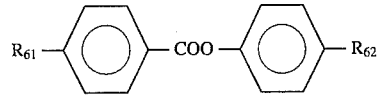
(6-4)

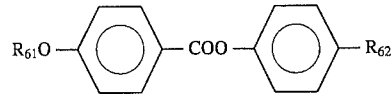
(6-5)

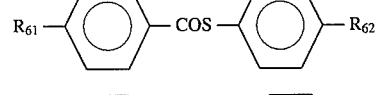
(6-6)

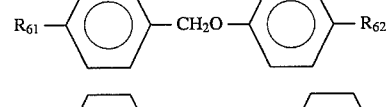
(6-7)

(6-8)

(6-9)

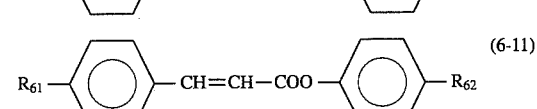
(6-10)

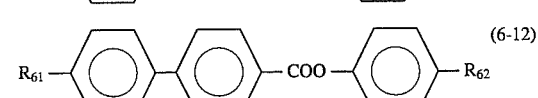
(6-11)

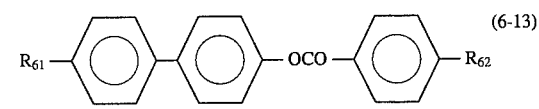
(6-12)

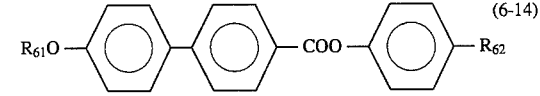
(6-13)

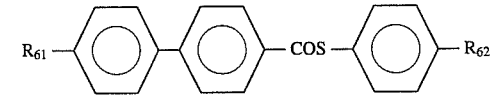
(6-14)

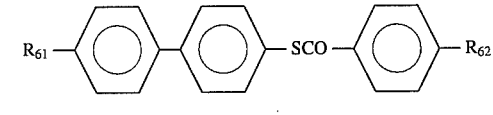
(6-15)

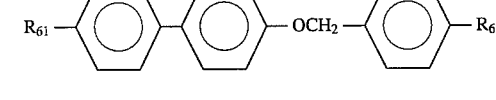
(6-16)

(6-17)

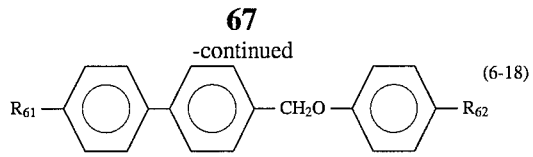

The other liquid crystal compound and the non-liquid crystal compound to be contained in the ferroelectric chiral smectic mixture of the present invention are not limited to those exemplified above.

The liquid crystal element of the present invention may be used in various types of liquid crystal devices or displays. A structure of the liquid crystal element is not limited.

FIG. 1 shows a schematic cross sectional view of an embodiment of the ferroelectric liquid crystal element, which comprises polarizing plates 1, glass substrates 2, transparent electrodes 3, orientation-controlling insulating films 4, a ferroelectric liquid crystal 5 and spacers 6.

One example of the liquid crystal element of FIG. 1 is a surface stabilized ferroelectric liquid crystal display, in which the ferroelectric liquid crystal is packed in a state of homogeneous orientation in a cell having a very narrow gap between a pair of the glass substrates 2, A thickness of: the ferroelectric liquid crystal layer 5 is determined by the gap between the pair of the glass substrates 2 and the thicknesses of the transparent electrodes 3 and the orientation-controlling insulating films 4, and is preferably from 0.5 to 20 μm, more preferably from 1 to 5 μm.

The transparent electrode 3 is provided on a surface of each glass substrate 2 on the side of the ferroelectric liquid crystal layer 5. As the transparent electrode, an ITO (indium oxide-tin oxide) film, an indium oxide film, a tin oxide film and the like are used. The orientation-controlling insulating film (alignment film) 4 is provided on the surface of each transparent electrode on the side of the ferroelectric liquid crystal layer 5. When the alignment film alone has a good insulating property, no additional insulating film is necessary. Otherwise, an additional insulating film may be provided beneath the alignment film.

As the orientation-controlling film, any of conventional organic, inorganic, low molecular or polymeric films can be used. Examples of the polymeric material are polyimide, polyamide, polyamideimide, polyvinyl alcohol, polystyrene, polyester, polyesterimide, and various kinds of photoresists.

When the polymeric material is used as the orientation-controlling film, its surface may be subjected to a so-called rubbing treatment comprising rubbing the surface with, for example, a piece of gauze or acetate flocked fabric in one direction, whereby the orientation of the liquid crystal molecules is facilitated further.

The additional insulating film may be formed from, for example, titanium oxide, aluminum oxide, zirconium oxide, silicon oxide, silicon nitride, and the like.

The alignment film and the insulating film may be formed by any suitable method according to the kinds of the materials forming the films.

For instance, in the case of a polymeric material, the polymeric material or its precursor is dissolved in a solvent in which it can be dissolved, and coated by screen printing, spinner coating, dip coating, etc. in the case of an inorganic material, dipping, vapor deposition, inclined vapor deposition and the like may be used.

A thickness of the alignment film is not critical, and preferably from 10 Å, to 20 μm, more preferably from 20 Å to 1000 Å.

The gap between the two glass substrates 3 on each of which the alignment film 4 and the transparent electrode 3 are provided is maintained at a predetermined distance using the spacers 6. As the spacer, an insulating material in the form of a bead, a fiber or a film having a specific diameter or thickness is used. Examples of the insulating material are silica, alumina and polymers.

The spacers are held between the pair of the glass substrates 2, and the periphery of the glass substrates is sealed with a sealant such as an epoxy adhesive to encapsulate the ferroelectric liquid crystal.

On the outer surface of the glass substrates 2, one or two polarizing plates 1 are provided. In the guest-host method using a dichromic dye, one polarizing plate is used, while in the birefringence method, tow polarizing plates are used. FIG. 1 shows the element using two polarizing plates. In such case, the two polarizing plates are placed in a state that their polarization axes are perpendicular to each other, namely, in the crossnicol state.

To each of the transparent electrodes 3, a suitable lead wire is bonded and then connected to an outer driving circuit.

The liquid crystal mixture having showing the ferroelectric chiral smectic C phase have better orientation property and memory capability than the conventional liquid crystals or mixtures which show the ferroelectric chiral smectic C phase, and can be used as a component of a liquid crystal element such as an optical shutter or a display.

PREFERRED EMBODIMENTS OF THE INVENTION

The present invention will be illustrated by the following Examples, which do not limit the scope of the present invention in any way.

Example 1

A liquid crystal mixture (1-a) was prepared by mixing the following compounds in the specified amounts:

| Compound | | Parts by mole |
|---|---|---|
| I-1: | 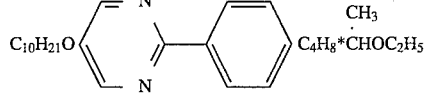 | 50 |
| II-1: | 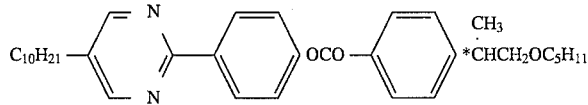 | 50 |

The mixture was held between a pair of glass substrates, on each of which a transparent electrode and a polyimide alignment film were coated, with adjusting a gap between the glass substrates to 2 μm using spacers. On the outer surfaces of the glass substrates, respective polarizing plates were provided with rotating their polarization planes at 90° to assemble a liquid crystal element. The polarization axis on the light incident side coincided with the rubbing direction of the polyimide alignment film.

With this liquid crystal element, a contrast ratio was measured by the following method:

When light was irradiated on the liquid crystal element and a direct current electric field of +20 V was applied, an intensity of transmitted light was measured by a photomultiplier and the liquid crystal element was rotated so that the intensity of the transmitted light was minimized. The intensity of the transmitted light in this state was designated as the value in the dark state. From this dark state, the liquid crystal element was rotated by an angle of 45°. The intensity of the transmitted light in this state was designated as the value in the bright state. The contrast ratio was calculated as a ratio of these two values.

In the above evaluation method, it is not necessary to take into consideration the difference of the contrast ratio due to the difference of a tilt angle of the liquid crystal, and the orientation property of the liquid crystal can be compared directly.

The contrast ratio of each of the compounds I-1 and II-1 was also measured in the same manner as above.

The measured contrast ratios are as follows:

Mixture 1-a:37

Compound I-1:3

Compound II-1:1

As seen from these contrast ratios, the mixture (1-a) comprising the compound (I-1) which is an example of the compound (I) and the compound (II-1) which is an example of the compound (II) had the much improved contrast ratio in comparison with each of the compounds (I-1) and (II-1).

Example 2

A liquid crystal mixture (2-a) was prepared by mixing the following compounds in the specified amounts:

| Compound | Parts by mole |
|---|---|
| I-2: 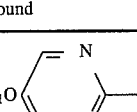 | 50 |
| II-2: 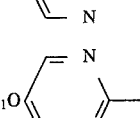 | 50 |

Using this liquid crystal mixture, a liquid crystal element was assembled by the same method as in Example 1 and its contrast ratio was measured by the same manner as in Example 1.

The measured contrast ratios are as follows:

Mixture 2-a:11

Compound I-2:3

Compound II-2:2

As seen from these contrast ratios, the mixture (2-a) comprising the compound (I-2) which is an example of the compound (I) and the compound (II-2) which is an example of the compound (II) had the much improved contrast ratio in comparison with each of the compounds (I-2) and (II-2).

Example 3

A liquid crystal mixture (3-a) was prepared by mixing the following three compounds in the-specified amounts:

| Compound | Parts by mole |
|---|---|
| 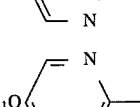 | 29.4 |
| | 37.5 |
| | 33.1 |

Using the liquid crystal mixture (3-a), a liquid crystal element was assembled by the same method as in Example 1 and its contrast ratio was measured by the same manner as in Example 1.

Next, the compound (II-3) was mixed in the liquid crystalline mixture (3-a) in the following amounts to prepare a liquid crystal mixture (3-b).

| Compound or Mixture | Parts by mole |
|---|---|
| Liquid crystal mixture (3-a) | 70 |
| II-3:  | 30 |

Using the liquid crystal mixture (3-b), a liquid crystal element was assembled by the same method as in Example 1 and its contrast ratio was measured by the same manner as in Example 1, The measured contrast ratios are as follows:

Mixture 3-b:44

Mixture 3-a:4

Compound II-3:1

As seen from these contrast ratios, the liquid crystal mixture (3-b) according to the present invention had the much improved contrast ratio.

Example 4

A liquid crystal mixture (4-a) was prepared by mixing the liquid crystal mixture (3-a) prepared in Example 3 and a compound (II-4) in the following amounts:

| Compound or Mixture | Parts by mole |
|---|---|
| Mixtue (3-a) | 50 |
| | 50 |
| II-4: 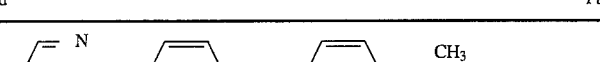 | |

Using this liquid crystal mixture (4-a), a liquid crystal element was assembled by the same method as in Example 1 and its contrast ratio was measured by the same manner as in Example 1.

The measured contrast ratios are as follows:

Mixture 4-a:12

Mixture 3-a:4

Compound II-4:

As seen from these contrast ratios, the liquid crystal mixture (4-a) of the present invention had the much improved contrast ratio.

Example 5

A liquid crystal mixture (5-a) was prepared by mixing the following compounds which are examples of the compound (II) in the specified amounts:

| Compound | Parts by mole |
|---|---|
| 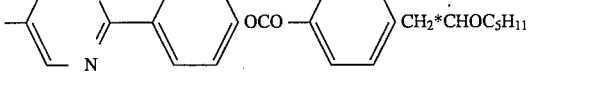 | 90 |
| | 10 |

Using the liquid crystal mixture (5-a), a liquid crystal element was assembled by the same method as in Example 1 and its contrast ratio was measured by the same manner as in Example 1.

Next, the compound (I-5) was mixed in the liquid crystal mixture (5-a) in the following amounts to prepare a liquid crystal mixture (5-b).

| Compound or Mixture | Parts by mole |
|---|---|
| I-5: $C_{10}H_{21}O$ — ... — $C_5H_{10}$*$CHOC_2H_5$ | 45 |
| Liquid crystal mixture (5-a) | 55 |

Using the liquid crystal mixture (5-b), a liquid crystal element was assembled by the same method as in Example 1 and its contrast ratio was measured by the same manner as in Example 1.

The measured contrast ratios are as follows:

Mixture 5-b:20

Compound I-5:1

Mixture 5-a:1

As seen from these contrast ratios, the liquid crystal mixture (5-b) according to the present invention had the much improved contrast ratio.

Example 6

A liquid crystal mixture (6-a) was prepared by mixing the following compounds in the specified amounts:

| Compound | Parts by mole |
|---|---|
| I-1: $C_{10}H_{21}O$—[pyrazine]—[phenyl]—$C_4H_8$*CHOC$_2$H$_5$ (with CH$_3$) | 50 |
| II-6: $C_7H_{15}$—[pyrazine]—[phenyl]—$OC_9H_{19}$ | 17.3 |
| II-7: $C_8H_{17}$—[pyrazine]—[phenyl]—$OC_8H_{17}$ | 17.3 |
| II-8: $C_8H_{17}$—[pyrazine]—[phenyl]—$OC_9H_{19}$ | 15.4 |

Using the liquid crystal mixture (6-a), a liquid crystal element was assembled by the same method as in, Example 1 and its contrast ratio was measured by the same manner as in Example 1.

Next, the compound (II-7) was mixed in the liquid crystalline mixture (6-a) in the following amounts to prepare a liquid crystal mixture (6-b).

| Compound or Mixture | Parts by mole |
|---|---|
| Liquid crystal mixture (6-a) | 70 |
| II-7: $C_{10}H_{21}$—[pyrazine]—[phenyl]—OCO—[phenyl]—$CH_2$*CHOC$_5$H$_{11}$ (with CH$_3$) | 30 |

Using the liquid crystal mixture (6-b), a liquid crystal element was assembled by the same method as in Example 1 and its contrast ratio was measured by the same manner as in Example 1.

The measured contrast ratios are as follows:

Mixture 6-b:64

Compound II-7:

Mixture 6-a:43

Since the compound II-7 as such does not have the chiral smectic C phase, its contrast ratio could not be measured.

As seen from these contrast ratios, the liquid crystal mixture according to the present invention had the much improved contrast ratio.

Example 7

A liquid crystal mixture (7-a) was prepared by mixing the following compounds in the specified amounts:

| Compound | Parts by mole |
|---|---|
| I-7: $C_{10}H_{21}O$—[pyrazine]—[phenyl]—$C_5H_{10}$—C*HOC$_2$H$_5$ (with CH$_3$) | 50 |
| IV-7: $C_{12}H_{25}O$—[phenyl]—COO—[phenyl]—$C_4H_8$—C*HOC$_3$H$_7$ (with CH$_3$) | 50 |

Using the liquid crystal mixture (7-a), a liquid crystal element was assembled by the same method as in Example 1.

To the liquid crystal element, a bipolar pulse wave having a peak-to-peak voltage $V_{p\text{-}p}$ of ±10 V/μm was applied, and a memory ratio was measured from the observed change of an amount of the transmitted light at 20° C.

The applied pulse wave consisted of a writing pulse and a bias pulse. A pulse amplitude ratio of the writing pulse to the bias pulse was adjusted to 4:1, and the writing pulse and the bias pulse were applied in a ratio of 1:499 in one period. An amount of the transmitted light when the writing pulse was applied in the dark state was designated as $Y_1$, an amount of the transmitted light just before the writing pulse was applied in the dark state was designated as $Y_2$, an amount of the transmitted light just before the writing pulse was applied in the bright state was designated as $Y_3$, and an amount of the transmitted light when the writing pulse was applied in the bright state was designated as $Y_4$. Then, a memory ratio was defined by $(Y_3-Y_2)\times 100/(Y_4-Y_1)$.

Figure 2A:
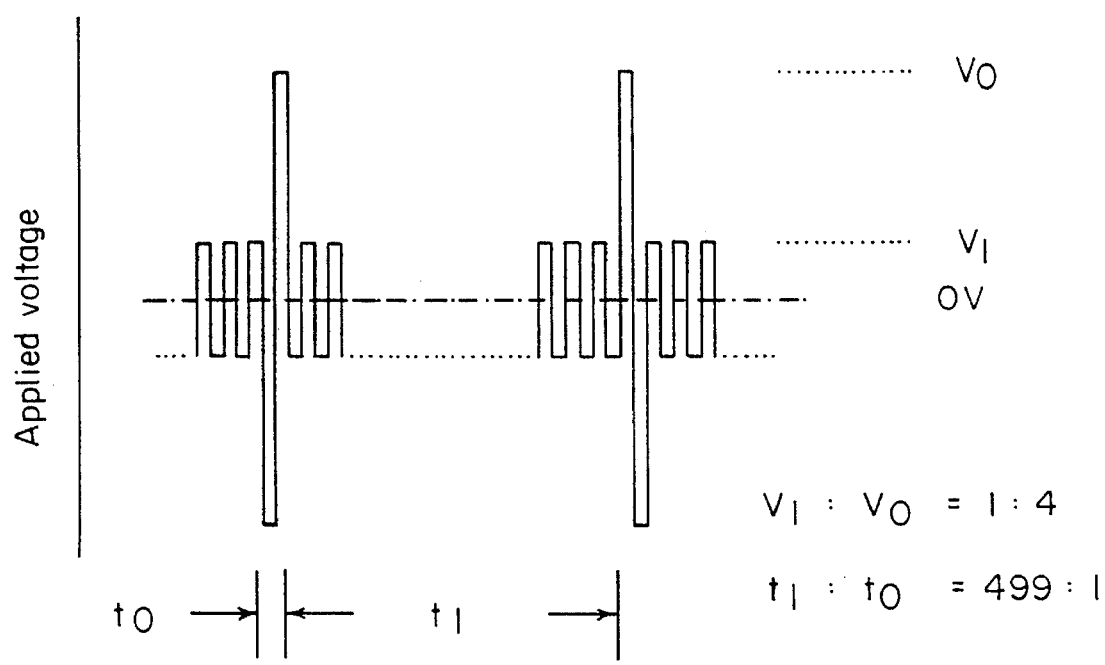
FIGS. 2A shows the form of the wave to be applied on the liquid crystal element in Example 7.
Figure 2B:
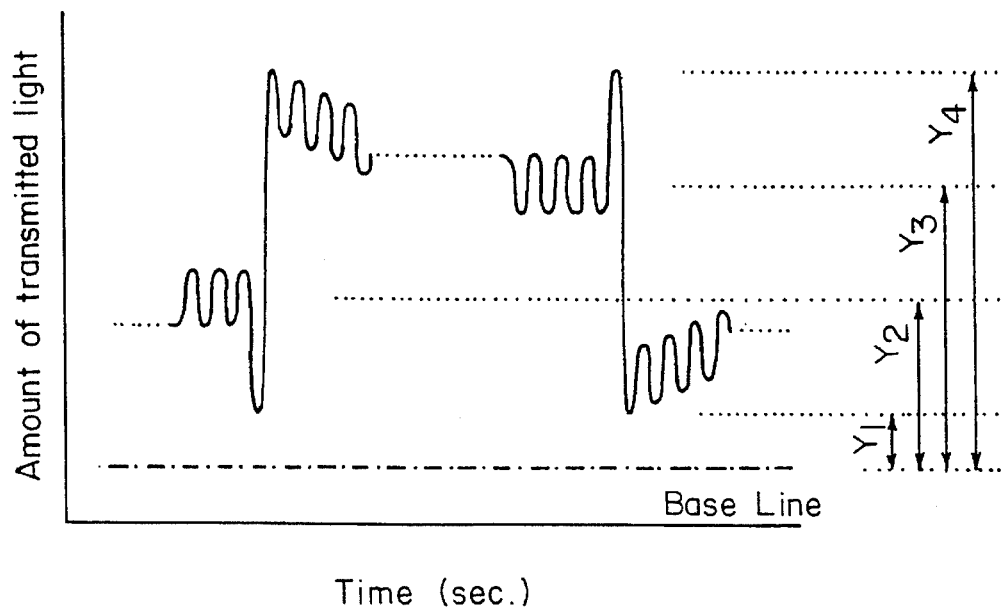
FIG. 2B shows the optical response pattern when the wave of FIG. 2A was applied.

FIG. 2A shows the form of the wave applied to the liquid crystal, and FIG. 2B shows the optical response.

The results are as follows:

Memory ratio (%)

Mixture 7-a:81

Compound I-7:10

Compound IV-7:50

From these memory ratios, it is seen that the liquid crystal mixture (7-a) comprising the compound (I-7) which is an example of the compound (I) and the compound (IV-7) which is an example of the compound (IV) provided the liquid crystal element having much improved memory ratio in comparison with the liquid crystal element using each compound independently.

Example 8

A liquid crystal mixture (8-a) was prepared by mixing the following compounds in the specified amounts:

| Compound | | Parts by mole |
|---|---|---|
| I-8: | 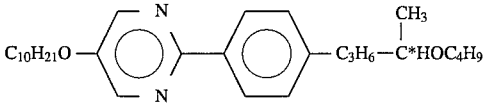 | 25 |
| IV-8 | 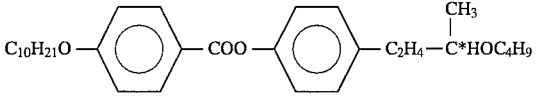 | 75 |

Using the liquid crystal mixture (8-a), a liquid crystal element was assembled by the same method as in Example 1, and its memory ratio was measured in the same manner as in Example 7 at 20° C. The results are as follows:

Memory ratio (%)

Mixture 8-a:95

Compound I-8:90

Compound IV-8:85

From these memory ratios, it is seen that the liquid crystal mixture (8-a) comprising the compound (I-8) which is an example of the compound (I) and the compound (IV-8) which is an example of the compound (IV) provided the liquid crystal element having much improved memory ratio in comparison with the liquid crystal element using each compound independently.

Example 9

A liquid crystal mixture (9-a) was prepared by mixing the following compounds in the specified amounts:

| Compound | | Parts by mole |
|---|---|---|
| I-7: | 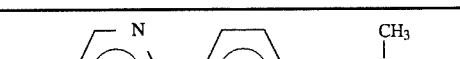 | 40 |
| IV-7 |  | 40 |
| II-8: |  | 20 |

Using the liquid crystal mixture (9-a), a liquid crystal element was assembled by the same method as in Example 1, and its memory ratio was measured in the same manner as in Example 7 at 20° C. The results are as follows:

Memory ratio (%)
Mixture 9-a:95
Compound I-7:10
Compound IV-7:50
Compound II-8:

From these memory ratios, it is seen that the liquid crystal mixture (9-a) comprising the compound (I-7) which is an example of the compound (I), the compound (IV-7) which is an example of the compound (IV) and the compound (II-8) which is an example of the compound (II) provided the liquid crystal element having much improved memory ratio in comparison with the liquid crystal element using each compound independently.

Since the compound (II-8) has no ferroelectric phase at 20° C., its memory ratio could not be measured.

Example 10

A liquid crystal mixture (10-a) was prepared by mixing the following compounds in the specified amounts:

| Compound | | Parts by mole |
|---|---|---|
| I-7: | 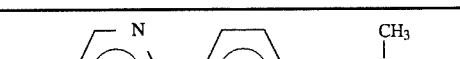 | 45 |
| IV-7 |  | 45 |
| I-10: |  | 10 |

Using the liquid crystal mixture (10-a), a liquid crystal element was assembled by the same method as in Example 1, and its memory ratio was measured in the same manner as in Example 7 at 20° C., The results are as follows:

Memory ratio (%)
Mixture 10-a:85
Compound I-7:10
Compound IV-7:50
Compound I-10:

From these memory ratios, it is seen that the liquid crystal mixture (10-a) comprising the compounds (I-7) and (I-10) which are examples of the compound (I) and the compound (IV-7) which is an example of the compound (IV) provided the liquid crystal element having much improved memory ratio in comparison with the liquid crystal element using each compound independently.

Since the compound (I-10) is a non-chiral compound, its memory ratio could not be measured.

Example 11

A liquid crystal mixture (11-a) was prepared by mixing the following compounds in the specified amounts:

| Compound | | Parts by mole |
|---|---|---|
| I-7: | 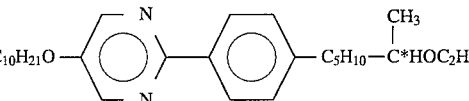 | 36 |
| IV-7 | | 36 |
| II-8: | | 18 |
| VI-11: | | 10 |

Using the liquid crystal mixture (11-a), a liquid crystal element was assembled by the same method as in Example 1, and its memory ratio was measured in the same manner as in Example 7 at 20° C. The results are as follows:

Memory ratio (%)
Mixture 11-a:85
Compound I-7:10
Compound IV-7:50
Compound II-8:
Compound VI-11:

From these memory ratios, it is seen that the liquid crystal mixture (11-a) comprising the compound (I-7) which is an example of the compound (I), the compound (IV-7) which is an example of the compound (IV), the compound (II-8) which is an example of the compound (II) and the compound (VI-11) which is an example of the compound (VI) provided the liquid crystal element having much improved memory ratio in comparison with the liquid crystal element using each compound independently.

Since the compound (II-8) has no ferroelectric phase at 20° C., its memory ratio could not be measured. Since the compound (VI-11) is a non-chiral compound, its memory ratio could not be measured either.

Example 12

A liquid crystal mixture (12-a) was prepared by mixing the following three compounds in the specified amounts:

| Compound | | Parts by mole |
|---|---|---|
| I-7: | 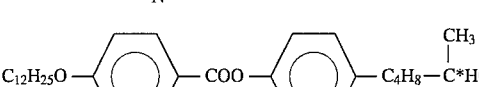 | 45 |
| IV-7 |  | 22.5 |
| IV-12: | | 22.5 |
| II-9: |  | 10 |

Using the liquid crystal mixture (12-a), a liquid crystal element was assembled by the same method as in Example 1, and its memory ratio was measured in the same manner as in Example 7 at 20° C. The results are as follows:

Memory ratio (%)
Mixture 12-a:85
Compound I-7:10
Compound IV-7:50
Compound IV-12:60
Compound II-9:

From these memory ratios, it is seen that the liquid crystal mixture (12-a) comprising the compound (I-7) which is an example of the compound (I), the compounds (IV-7) and (IV-12) which are examples of the compound (IV) and the compound (II-9) which is an example of the compound (II) provided the liquid crystal element having much improved memory ratio in comparison with the liquid crystal element using each compound independently.

Since the compound (II-9) has no ferroelectric phase at 20° C., its memory ratio could not be measured.

What is claimed is:

1. A ferroelectric chiral smectic liquid crystal mixture comprising:

at least one compound of the formula (I):

$$R_{11}-(X_1)p-Ar_1-Y_{11}-\left(\begin{array}{c}CZ_3\\|\\*CH\end{array}\right)_q-(Y_{12})_r-R_{12} \quad (I)$$

wherein $R_{11}$ is an alkyl group having 5 to 15 carbon atoms; $R_{12}$ is an alkyl group having 1 to 10 carbon atoms or an alkoxyalkyl group having 2 to 10 carbon atoms, which may be substituted by at least one halogen atom; $X_1$ is —O—, —COO— or —OCO—; $Ar_1$ is one of the groups:

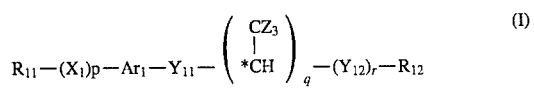

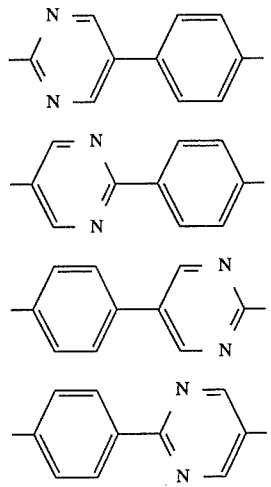

$Y_{11}$ is —(CH$_2$)$_m$— or —CH=CH—(CH$_2$)$_n$— in which m is an integer of 0 to 10 and n is an integer of 0 to 8; Z is a hydrogen atom or a fluorine atom; $Y_{12}$ is —O—, —COO— or —OCO—; p and r are each 0 or 1; q is 1; and the asterisk * indicates an asymmetric carbon atom, and at least one compound selected from the group consisting of a compound of the formula (II):

$$R_{21}-(X_{21})s-Ar_2-X_{22}-\underset{}{\bigcirc}-Y_{21}-\left(\begin{array}{c}CZ_3\\|\\*CH\end{array}\right)_t-(Y_{22})u-R_{22} \quad (II)$$

wherein $R_{21}$ is an alkyl group having 5 to 15 carbon atoms; $R_{22}$ is an alkyl group having 1 to 20 carbon atoms or an alkoxyalkyl group having 2 to 20 carbon atoms; $X_{21}$ is —O—, —COO— or —OCO—; $X_{22}$ is —COO— or —OCO—; t is 0 or 1; $Ar_2$ is one of the groups:

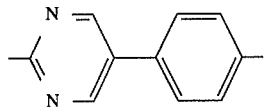

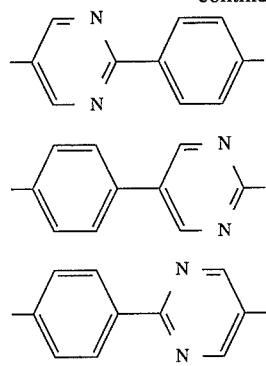

Z is a hydrogen atom or a fluorine atom; $Y_{21}$ is —(CH$_2$)$_k$— in which k is an integer of 0 to 10 when t is 1 or an integer of 0 to 11 when t is 0; $Y_{22}$ is —O— or —OCO—; s, t and u are each 0 or 1; and the asterisk * indicates an asymmetric carbon atom and a compound of the formula (III):

$$R_{31}-(X_3)_v-Ar_3-Y_{31}-\left(\begin{array}{c}CZ_3\\|\\*CH\end{array}\right)_w-(Y_{32})_a-R_{32} \quad (III)$$

wherein $R_{31}$ is an alkyl group having 5 to 15 carbon atoms; $X_3$ is —O—, —COO— or —OCO—; $R_{32}$ is an alkyl group having 1 to 20 carbon atoms or an alkoxyalkyl group having 2 to 20 carbon atoms; $Ar_3$ is one of the groups:

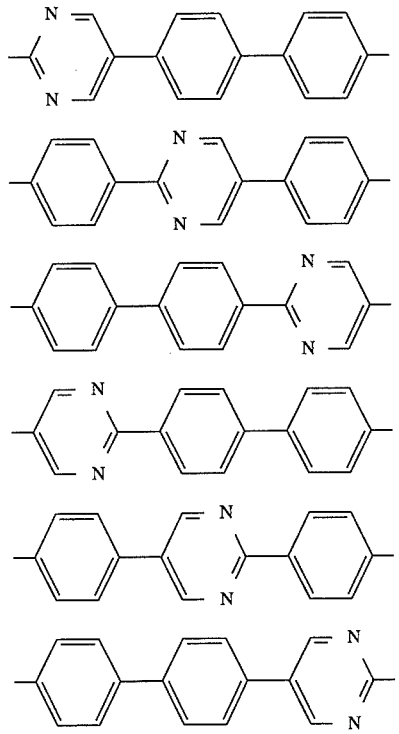

Z is a hydrogen atom or a fluorine atom; $Y_{31}$ is —(CH$_2$)$_j$— in which j is an integer of 0 to 10 when w is 1 or an integer of 0 to 11 when w is 0; $Y_{32}$ is —O— or —OCO—; v, w and a are each 0 or 1; and the asterisk * indicates an asymmetric carbon atom, where a molar ratio of the compound (I) to at least one compound selected from the group consisting of the compound (II) and the compound (III) is from 80:20 to 20:80.

2. A ferroelectric chiral smectic liquid crystal mixture comprising:

at least one compound of the formula (I) in claim 1 and at least one compound of the formula (IV):

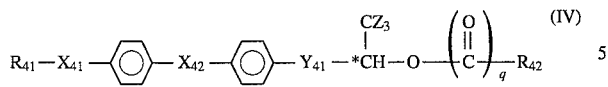

wherein $R_{41}$ is an alkyl group having 5 to 15 carbon atoms; $R_{42}$ is an alkyl group having 1 to 10 carbon atoms or an alkoxyalkyl group having 2 to 10 carbon atoms, which may be substituted by at least one halogen atom; $X_{41}$ is —O—, —COO—, —OCO— or a single bond; $X_{42}$ is —COO— or —OCO—; $Y_{41}$ is —$(CH_2)_m$— in which m is an integer of 1 to 10; three Z substituents are independently a hydrogen atom or a fluorine atom; q is 0 or 1; and the asterisk * indicates an asymmetric carbon atom, where a molar ratio of the compound (I) to the compound (IV) is from 10:90 to 75:25.

3. A ferroelectric chiral smectic mixture comprising:

at least one compound of the formula (I) wherein q is 1 and m is an integer of at least 1; and $Y_{12}$ is —O— or —OCO— and at least one compound of the formula (IV) in claim 2 where a molar ratio of the compound (I) to the compound (IV) is from 10:90 to 75:25.

4. A ferroelectric chiral smectic mixture comprising:

the ferroelectric chiral smectic liquid crystal mixture of claim 1, and at least one compound of the formula (IV):

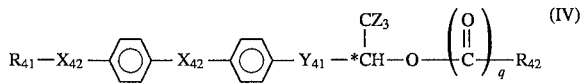

wherein $R_{41}$ is an alkyl group having 5 to 15 carbon atoms; $R_{42}$ is an alkyl group having 1 to 10 carbon atoms or an alkoxyalkyl group having 2 to 10 carbon atoms, which may be substituted by at least one halogen atom; $X_{41}$ is —O—, —COO—, —OCO— or a single bond; $X_{42}$ is —COO— or —OCO—; $Y_{41}$ is —$(CH_2)_m$— in which m is an integer of 1 to 10; three Z substituents are independently a hydrogen atom or a fluorine atom; q is 0 or 1; and the asterisk * indicates an asymmetric carbon atom, wherein the molar composition is 10 to 75 parts by mole of the compound (I); 80 to 1 parts by mole of at least one compound selected from the group consisting the compound of the formula (II) and the compound (III); and 90 to 1 parts by mole of the compound (IV), provided that the total amount of the compounds (I), (II), (III) and (IV) is 100 parts by mole.

5. A liquid crystal device comprising a pair of electrode substrates and a ferroelectric chiral smectic liquid crystal mixture as claimed in claim 1.

6. A liquid crystal device comprising a pair of electrode substrates and a ferroelectric chiral smectic liquid crystal mixture as claimed in claim 2.

7. A liquid crystal device comprising a pair of electrode substrates and a ferroelectric chiral smectic liquid crystal mixture as claimed in claim 3.

8. A liquid crystal device comprising a pair of electrode substrates and a ferroelectric chiral smectic liquid crystal mixture as claimed in claim 4.

* * * * *